(12) United States Patent
Khemka et al.

(10) Patent No.: US 11,582,431 B1
(45) Date of Patent: Feb. 14, 2023

(54) IMAGE SIGNAL PROCESSING PIPELINES FOR HIGH DYNAMIC RANGE SENSORS

(71) Applicant: NVIDIA Corporation, Santa Clara, CA (US)

(72) Inventors: Animesh Khemka, Fremont, CA (US); Sean Midthun Pieper, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/461,750

(22) Filed: Aug. 30, 2021

(51) Int. Cl.
*H04N 9/04* (2006.01)
*H04N 19/149* (2014.01)

(52) U.S. Cl.
CPC ....... *H04N 9/04515* (2018.08); *H04N 19/149* (2014.11)

(58) Field of Classification Search
CPC ............. H04N 5/232; H04N 5/232933; H04N 9/04515; H04N 9/149
See application file for complete search history.

(56) References Cited

U.S. PATENT DOCUMENTS

2015/0207974 A1\* 7/2015 Mody ................ H04N 5/35581
348/296

\* cited by examiner

*Primary Examiner* — Yogesh K Aggarwal
(74) *Attorney, Agent, or Firm* — Lowenstein Sandler LLP

(57) ABSTRACT

Apparatuses, systems, and techniques to receive, at one or more processor associated with an image signal processing (ISP) pipeline, a compressed image generated by an image sensor, wherein the compressed image is captured at a first bit-depth associated with the image sensor and is compressed to a second bit-depth that is lower than the first bit-depth, and wherein the ISP is associated with a third bit-depth that is lower than the first bit-depth and higher than the second bit-depth; and decompress the compressed image according to a power curve to generate a partially decompressed image having the third bit-depth, wherein a plurality of regions of the partially decompressed image are decompressed at separate decompression amounts based on a corresponding pixel value of each region of the plurality of regions.

25 Claims, 11 Drawing Sheets

IMAGE SIGNAL PROCESSING PIPELINES FOR HIGH DYNAMIC RANGE SENSORS

TECHNICAL FIELD

Embodiments disclosed herein pertain to compression and decompression of images, including decompression of images within an image signal processing (ISP) pipeline. For example, at least one embodiment pertains to processors or computing systems used to decompress a compressed image according to a power curve to generate a partially decompressed image according to various novel techniques described herein.

BACKGROUND

High dynamic range (HDR) image sensors capture data with a large dynamic range often exceeding the memory, hardware and data bandwidth available to process them. Accordingly, raw image data at image sensors is commonly compressed to reduce the bandwidth requirements during transmission to an ISP pipeline. The data is then de-compressed at the ISP to process the data. Modern image sensors (e.g., automotive sensors) are often HDR image sensors that support high bit-depths of images in order to provide a large dynamic illumination range when capturing images, for example at 24 bit resolution. The ISP hardware, on the other hand, may not be capable of supporting such a high bit depth as the image sensor, resulting in potential degradation in image quality after recovering the image at the ISP due to the difference in bit depth resolution between the sensor and the ISP.

DETAILED DESCRIPTION

Figure 1:
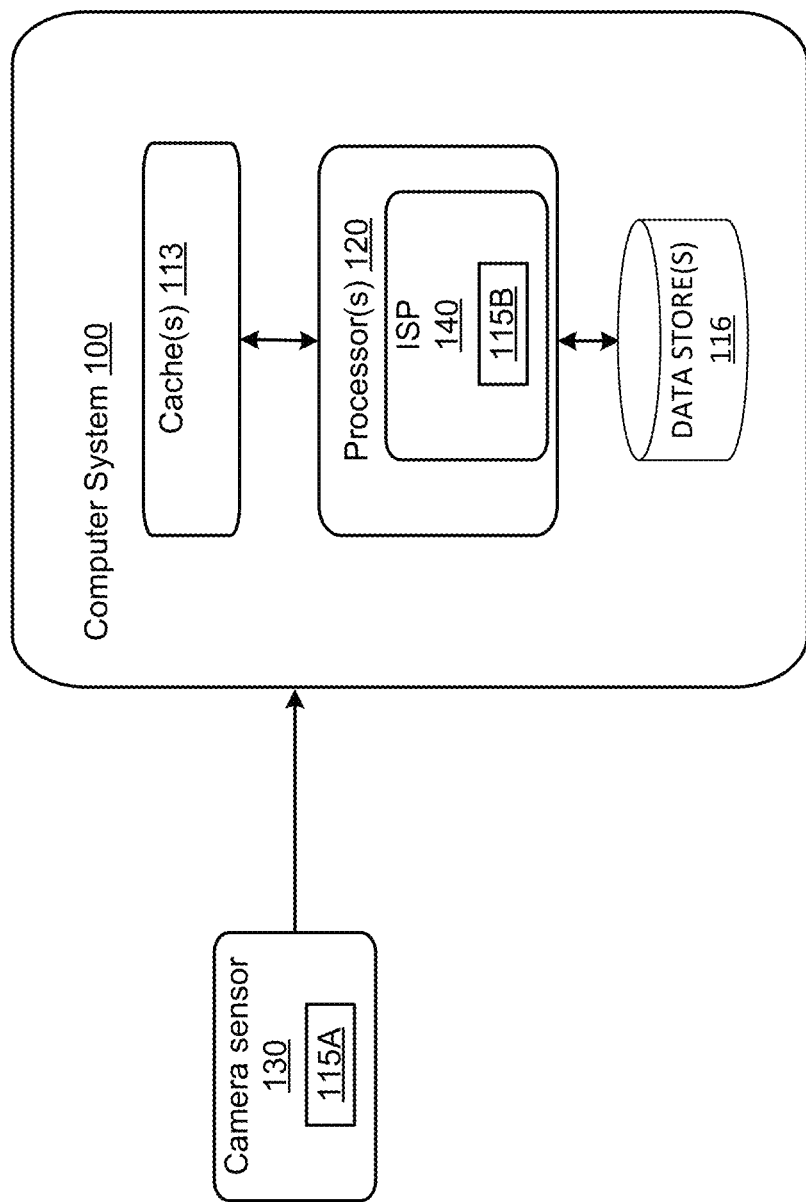
FIG. 1 illustrates a computer system for hosting and executing camera image compression component, according to at least one embodiment.

Compression and Decompression Scheme for Image Signal Processing Pipelines

In at least one embodiment, an approach of implementing a new compression and/or decompression scheme for processing of high dynamic range (HDR) images in image signal processing (ISP) pipelines is provided to achieve high performance without color ratio or signal to noise ratio (SNR) degradation. In certain implementations, the compression and/or decompression scheme is used to process data generated at an initial high bit depth from a camera sensor, such that the data can be decompressed at an ISP to a lower bit depth than the initial high bit depth, while preserving SNR and color accuracy. The sensor compression and ISP decompression may be performed using a piecewise linear (PWL) spline function that is implemented according to a power curve using curve fitting techniques. The power curve may be selected to compress an HDR image from the sensor bit-depth to the ISP bit-depth, where a level of compression of a certain region of the image is based on a pixel value of the region according to the power curve. In one or more embodiments, the power curve may be generalized with two parameters (a constant and a power) to allow for a linear approximation initially without degrading image quality in embodiments. The power of the power curve may be based on a target compression ratio (e.g., ratio of input bit-depth to output bit-depth). As an example, the pixel value of the region of the image may be a luminance value of the region of the image and/or a radiance value of the region of the image. Luminance values, measured in lux, and radiance values, measured in wattage, represent an amount of light coming from each surface in a scene within the image. In certain implementations, a portion of the power curve may be approximated with a linear segment. In one embodiment, the linear segment is used for compressing/decompressing regions of an image that has low pixel values (e.g., for compressing/decompressing pixels of the image that have a pixel value below a certain threshold). In this case, using a linear segment for compressing/decompressing low pixel value (e.g., low signal) regions of an input image may preserve the SNR in low-light areas of the image where noise increase due to quantization can be most critical.

Embodiments enable a system to combine an image sensor with a high bit depth (e.g., an HDR camera) with an ISP having a lower bit depth without degradation in SNR or color ratio in processed images. The decompression function and optionally the compression function may be tailored to provide a non-linear decompression and/or compression that minimizes SNR and color ratio degradation. As a result, embodiments of the present disclosure enable system designers to select image sensors and ISP pipeline components with greater flexibility, which in turn enables them to reduce cost without reducing functionality. In embodiments, image sensors and ISP pipelines may be configured to capture an entire scene of interest in a single exposure. Additionally, in embodiments image sensors and ISP pipelines may be configured to operate using a single mode that can function both in night scenes and day scenes, eliminating use of a separate night mode and day mode. Embodiments enable settings of the image sensor and/or ISP to be tuned to be a superset of a two-mode (e.g., night mode and day mode) exposure system irrespective of the bit depth of the ISP hardware. Thus, in embodiments image sensors may be simplified by eliminating one or more operating modes and mode transitions between the operating modes, removing transition artifacts. Further, this leads to simplified software that lacks an auto exposure algorithm (which ordinarily would be used to control sensor settings of the image sensor). Additionally, embodiments enable image sensors to be configured with fixed settings, which make the system safer and results in simplification of a sensor driver, saving significant engineering and quality analysis efforts.

The present disclosure provides techniques and methods for compressing and decompressing HDR images between a sensor of a camera having a high bit-depth and an ISP having a lower bit-depth than that of the camera sensor while maintaining the SNR and color accuracy of the image. The compression and/or decompression may be configured based on camera bit-depth, transmission bit-depth (for transmission between camera and ISP), and/or ISP bit-depth. A power curve may be determined for compression at the camera and/or for decompression at the ISP based on camera bit-depth, transmission bit-depth and/or ISP bit depth. For example, a first power curve may be determined for compression, and a second power curve may be determined for decompression. By configuring the level of compression and/or decompression according to the power curve, the size of the compressed image and/or decompressed image (e.g., partially decompressed image that is decompressed to the bit-depth of the ISP) can be optimized. Decompression and/or compression performed according to the power curve may cause less compression to be performed for regions of the image with low luminance values while more compression is performed for regions of the image with high luminance values. In some embodiments, a linear segment is determined as a replacement for a portion of the power curve. The linear segment may be an approximation of the power curve for low pixel values (e.g., low signal) that have values that are less than a threshold, thus preserving SNR and color accuracy for darker regions of the image that have insufficient light. Additionally, using a linear segment for compressing/decompressing low pixel value regions of the image can result in compression and/or decompression of images without significant degradation to image attributes.

FIG. 1 illustrates a system for hosting and executing camera image compression/decompression components 115A-115B, according to at least one embodiment. In at least one embodiment, a computer system 100 may be a server, a system on a chip (SoC), a desktop computer, a laptop computer, a mobile computing device, a cloud computing environment, and/or any other computer system. In at least one embodiment, computer system 100 may include, without limitation, one or more processors 120 representing one or a plurality of graphical processing units (GPU)s, central processing units (CPU)s, and/or any other processors. Computer system 100 may further include cache(s) 113, data store(s) 116, and/or other components and features not illustrated. Computer system 100 may include an ISP 140, which may be implemented using one or more processors 120, a camera sensor 130, and optionally one or more other components. In embodiments, the camera sensor 130 and computer system 100 may be components of a device such as a mobile phone, an autonomous vehicle, a non-autonomous vehicle, a video surveillance system, a laptop computer, a desktop computer, a quality analysis (QA) inspection system, or other system.

In at least one embodiment, computer system 100 may include any number of cache(s) 113, including those described herein. For example, in at least one embodiment, cache(s) 113 could include a level three ("L3") cache and/or a level two ("L2") cache that is available to both CPU(s) and GPU(s) of computer system 100. In at least one embodiment, cache(s) 113 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, computer system 100 may include data store(s) 116 (e.g., memory). In at least one embodiment, data store(s) 116 may be on-chip memory of computer system 100, which may store neural networks, one or more components of an image processing pipeline, etc. to be executed on GPU(s) of computer system 100. In at least one embodiment, data store(s) 116 may comprise L2 or L3 cache(s).

In at least one embodiment, processor(s) 120 may include embedded processors. In at least one embodiment, processor(s) 120 may include a boot and power management processor that may be a dedicated processor and subsystem to handle boot power and management functions and related security enforcement. In at least one embodiment, a boot and power management processor may be a part of a boot sequence of system 100 and may provide runtime power management services. In at least one embodiment, a boot power and management processor may provide clock and voltage programming, assistance in system low power state transitions, management of system 100 thermals and temperature sensors, and/or management of system 100 power states. In at least one embodiment, each temperature sensor may be implemented as a ring-oscillator whose output frequency is proportional to temperature, and system 100 may use ring-oscillators to detect temperatures of CPU(s), GPU(s), and/or accelerator(s) of system 100.

In at least one embodiment, processor(s) 120 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 120 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 120 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 120 may further include a real-time camera engine that may include, without limitation, a dedicated processor subsystem for handling real-time camera management. In at least one embodiment, processor(s) 120 may further include a signal processor such as a high-dynamic range signal processor that may include, without limitation, an image signal processor that is a hardware engine that is part of an ISP 140. Processor(s) 120 may further interact with camera sensor 130 (also referred to as an image sensor) for receiving and processing images from the camera sensor 130.

In at least one embodiment, processor(s) 120 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 120, surround camera(s) 120, and/or on in-cabin monitoring camera sensor(s).

Camera sensor 130 may be an image sensor or imager that detects and conveys information used to make an image from a camera by converting the variable attenuation of light waves reflecting off of objects within the image into signals as small bursts of current that convey the information. The waves may be light or other electromagnetic radiation. Camera sensor 130 may be used in electronic imaging devices of both analog and digital types including digital cameras, camera modules, camera phones, optical mouse devices, medical imaging equipment, night vision equipment, radar, sonar, and/or other imaging devices.

ISP 140 may perform an intermediate set of digital image processing operations in order to process an image for rendering, such that a processed image is optimized for colorimetric precision, minimum hardware cost, and/or low CPU utilization. In at least one embodiment, the ISP 140 (or at least components of the ISP 400) is comprised of computer system 100 and/or processor(s) 120 of computer system 100. In at least one embodiment, ISP 140 (or at least components of the ISP) may be a component within a camera that is responsible for image processing before outputting an image from the camera. In at least one embodiment, ISP 140 may be a remote and/or separate component that may process images from a camera that is connected to ISP 140. In this case, a remote ISP 140 may be connected to any number of compatible cameras to process images from each camera. In at least one embodiment, operations performed by ISP 140 may include any combination of applying a Bayer filter, performing noise reduction, performing shading correction, performing image scaling, performing gamma correction, performing image enhancement, performing color space conversion, performing linearization, applying demosaic techniques, performing framerate conversion, performing image compression and/or decompression, and/or performing data transmission. ISP 140 may include components to be used between an image source, such as camera sensor 130 or a scanner, and an image renderer such as a television set, a printer, or a computer screen, to perform said operations. ISP 140 may be implemented as computer software, in a digital signal processor, on a general purpose processor, on a special purpose processor, on a field-programmable gate array (FPGA), on an analog circuit, or as a fixed-function application-specific integrated circuit (ASIC). ISP 140 may be or include a digital signal processor (DSP) that may be executed by a digital CPU with a dedicated hardware processing unit that is optimized for certain types of computations for processing images from camera sensor 130.

Camera image compression/decompression components 115A-B may be used to perform compression and/or decompression of images according to one or more embodiments. In at least one embodiment, camera image compression/decompression components 115A-B may provide new compression and/or decompression schemes for high dynamic range (HDR) images in image signal processing (ISP) pipelines, to achieve high performance without color ratio or signal to noise ratio (SNR) degradation. In certain implementations, camera image compression/decompression component(s) 115A-B may provide a compression and/or decompression scheme to process data generated at an initial high bit depth from camera sensor 130, such that the data can be decompressed at ISP 140 to a lower bit depth than the initial high bit depth, while preserving SNR and color accuracy. Camera image compression/decompression component(s) 115A-B may perform compression and/or decompression using piecewise linear (PWL) spline functions. In one embodiment, image compression/decompression component 115A in camera sensor 130 performs compression using a first PWL spline function and camera image compression/decompression component 115B performs decompression and/or compression using a second PWL spline function. The second PWL spline function may have been determined based on the first PWL spline function and a determined power curve, as set forth below. A piecewise linear function may refer to a function defined on intervals of real numbers, such that there is a collection of intervals on each of which the PWL function represents an affine transformation. An affine transformation may refer to a geometric transformation that preserves lines and parallelism, but may or may not preserve distances and angles.

In some implementations, camera image compression/decompression component(s) 115A-B perform the compression and/or decompression algorithms according to a power curve. The power curve may be selected to compress an HDR image from the sensor bit-depth of the camera sensor (e.g., 24 bits) to the ISP bit-depth (which may be lower than the sensor bit-depth, such as 20 bits), where a level of compression of a certain region of the image is based on a pixel value of the region according to the power curve. As an example, the pixel value of the region of the image may be a luminance value of the region of the image and/or a radiance value of the region of the image. Luminance values, measured in lux, and radiance values, measured in wattage, represent an amount of light coming from each surface in a scene within the image. By controlling the level of compression and/or decompression of a region of the HDR image based on the luminance conditions of the region according to the power curve, camera image compression/decompression component(s) 115A-B can optimize the size of the compressed image, such that less compression is performed for regions of the image with low luminance values while more compression is performed for regions of the image with high luminance values, thus preserving SNR and color accuracy for darker regions of the image that have less or insufficient light.

In certain implementations, camera image compression/decompression component(s) 115 use a compression/decompression power curve. The power curve may include a linear segment for compressing/decompressing regions of an image that has low pixel values (e.g., for compressing/decompressing pixels of the image that have a luminance or radiance value below a certain threshold). In this case, using a linear segment for compressing/decompressing low pixel value regions of an input image may preserve the SNR in low-light areas of the image where noise increase due to quantization can be most critical. In one embodiment, pixel values below the certain threshold may not be compressed or may be compressed according to a linear function rather than a non-linear function. Additionally, using a linear segment (e.g., which may not apply compression) for compressing/decompressing low pixel value regions of the image can result in compression and/or decompression of images without significant degradation to image attributes, as explained in more details herein below.

In one implementation, camera image compression/decompression component 115B may receive, at processor(s) 120, a compressed image generated by camera sensor 130 and compressed by camera image compression/decompression component 115A, to be processed at ISP 140. In some implementations, the compressed image is captured by camera sensor 130 at the bit-depth of camera sensor 130 and then camera image compression/decompression component 115A compressed the captured image to a different bit-depth that is lower than the camera sensor bit-depth. A bit-depth of an image may represent the amount of color information stored in the image, such that the higher the bit depth of the image, the more colors it can store. As an example, the simplest image may be a 1 bit image, which can only show two colors, black and white. In an implementation, camera image compression/decompression component 115A compresses the captured image from camera sensor 130 by applying different amounts or levels of compression to different regions of the captured image according to a power curve, based on a corresponding pixel value of each region, such that SNR and color accuracy of darker regions of the image are not degraded during compression/decompression. The power curve may be a curve with two degrees of freedom. In embodiments, a portion of the power curve associated with pixel values below a threshold is approximated with a linear segment. As an example, camera image compression/decompression component 115A may apply a first compression level to a first region of the captured image having a first pixel value, and then apply a second compression level to a second region of the captured image having a higher second pixel value, such that the first compression level is lower than the second compression level.

In an implementation, camera image compression/decompression component 115 checks to find out if the bit-depth of camera sensor 130 equals the bit-depth of ISP 140. If the bit-depth of camera sensor 130 is higher than the bit-depth of ISP 140 and the bit-depth of ISP 140 is higher than the bit-depth of the compressed image, camera image compression/decompression component 115B performs a decompression for the image from the bit-depth of the compressed image to the bit-depth of ISP 140 using a power curve, such that the decompressed image may be processed by ISP 140 at the bit-depth of ISP 140, as explained in more details below, with respect to FIG. 3.

In one implementation, camera image compression/decompression component 115B decompresses the image from the bit-depth of a compressed version of the image to the bit-depth of ISP 140 using a power curve that corresponds at least in part to a piecewise linear (PWL) spline function. The PWL spline function includes a set of knee points. Camera image compression/decompression component 115B or another computer system may determine the power curve based on the set of the knee points of the PWL function using a curve fitting technique. The curve fitting technique may refer to a process of approximating the knee points of the PWL function to a known curve by sampling the curve and interpolating linearly between the points. The technique may further use an algorithm for computing the most significant knee points from the curve, subject to a certain error tolerance. In some implementations, the power curve includes a linear segment that extends to a pixel value threshold for linearly processing image pixel values that are below the pixel value threshold, in order to preserve SNR and color accuracy of the low pixel value regions of the image. In this case, camera image compression/decompression component 115B may avoid compression of (e.g., may fully decompress) the image pixel values below the pixel value threshold to preserve signal to noise ratio (SNR) of the image pixel values below the threshold. Alternatively, the compression and/or decompression of the pixel values below the threshold may be performed according to a linear function rather than a power function.

In some implementations, camera image compression/decompression component 115B decompresses regions of the image at different decompression amounts based on a corresponding pixel value of each region of the image. As an example, camera image compression/decompression component 115B may apply a first decompression amount to a first region of the compressed image having a certain pixel value; and may apply a second decompression amount to a second region of the compressed image having a higher pixel value than the pixel value of the first region, such that after decompression the second region has a greater residual compression than the first region. In some embodiments, the first decompression amount is lower than the second decompression amount. In some embodiments, the second decompression amount is greater than the first decompression amount. In certain implementations, the pixel value of a given region of the image corresponds to a luminance value of the region, indicating an amount of light of the captured region of the image.

Figure 2:
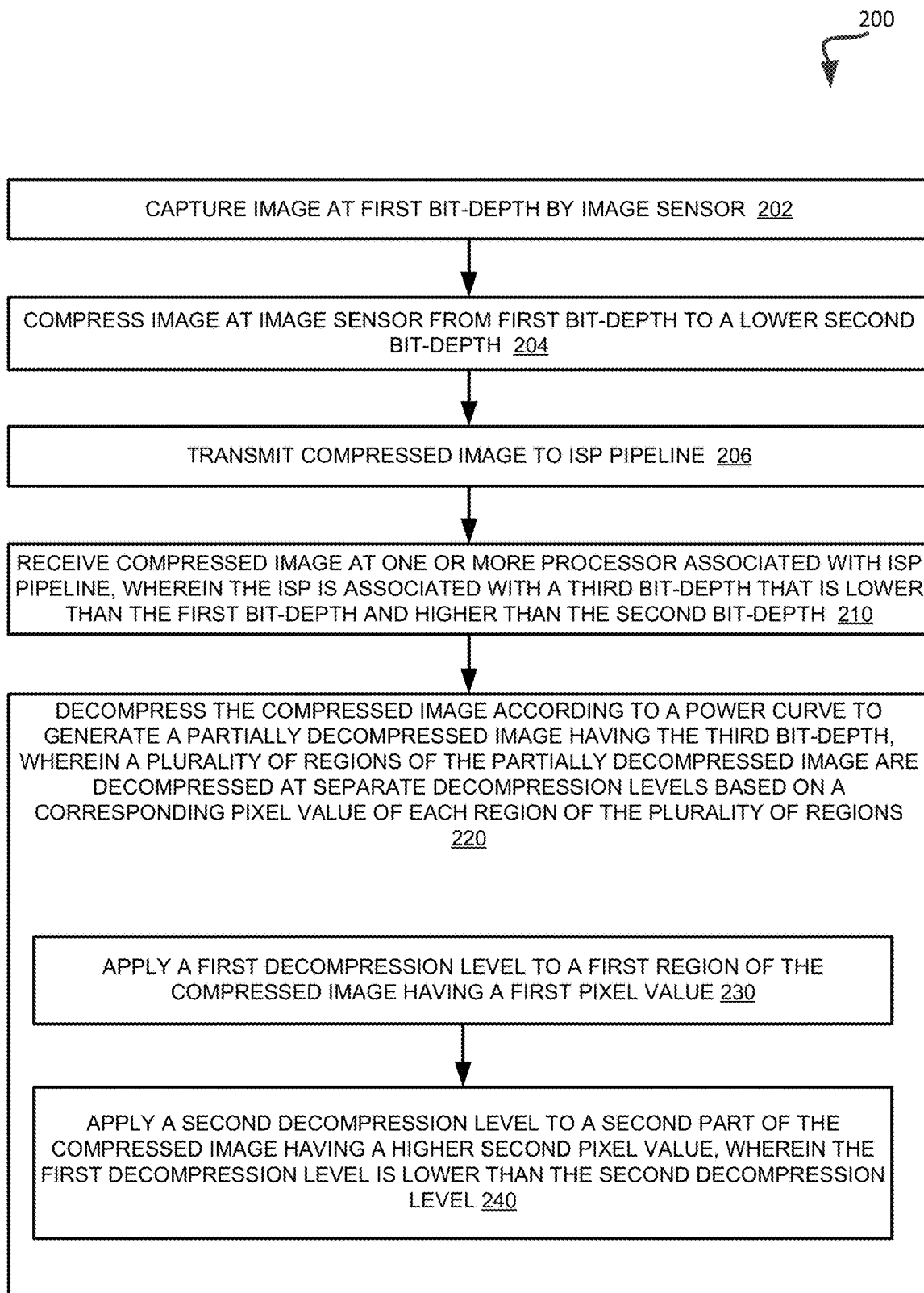
FIG. 2 is a flow diagram of a process for executing compression and decompression algorithms for HDR images in an ISP pipeline, in accordance with at least one embodiment.

FIG. 2 is a flow diagram of a process 200 for executing compression and decompression algorithms for HDR images in an ISP pipeline, in accordance with at least one embodiment. In at least one embodiment, a processing logic implementing process 200 may provide a compression and/or decompression scheme to process data generated at an initial high bit depth from a camera sensor, such that the data can be decompressed at an image signal processor (ISP) to a lower bit depth than the initial high bit depth, while preserving SNR and color accuracy.

At operation 202, an image sensor captures an image at a first bit-depth. The image sensor may be, for example, an HDR image sensor that captures images at a high bit-depth (e.g., a bit-depth of 24 bits). The image sensor may be an HDR sensor having a bit depth of, for example, 20 bits, 24 bits, 26 bits, 32 bits, and so on. At operation 204, the image sensor (e.g., a processing device at the image sensor) compresses the image from the first bit depth to a lower second bit depth (e.g., from a bit-depth of 24 bits to a bit-depth of 12 bits). The bit-depth to which the image is compressed may be based on a bandwidth of a connection between the image sensor and an ISP. The second bit-depth may be, for example, 8 bits, 10 bits, 12 bits, 14 bits, 16 bits, 18 bits, and so on. In some embodiments, the compression is performed using PWL compression. Alternatively, other compression techniques may be used, such as cubic compression, look-up table compression, and so on. In certain implementations, the image is compressed using a power curve that may or may not include a linear segment. The power curve may be determined based on properties of the image sensor, and may be selected such that images compressed according to the power curve and then later decompressed (to the original or a different bit-depth) retain close to an original color ratio and SNR. In one embodiment, a PWL compression function is determined based on the determined power curve. At operation 206, the image sensor transmits the compressed image to an ISP pipeline.

At operation 210, the processing logic receives, at one or more processor associated with an image signal processing (ISP) pipeline, the compressed image generated by the image sensor, wherein the ISP is associated with a third bit-depth that is lower than the first bit-depth and higher than the second bit-depth (e.g., has a bit-depth of 16-22 bits such as a bit depth of 20 bits). The ISP may have the same bit depth as the image sensor or a lower bit depth than the image sensor. For example, the ISP may have a bit depth of 10 bits, 12 bits, 14 bits, 16 bits, 18 bits, 20 bits, 22 bits, 24 bits, and so on.

At operation 220, the processing logic decompresses the compressed image according to the power curve (or a different power curve) to generate a partially decompressed image having the third bit-depth. A plurality of regions of the partially decompressed image may be decompressed by separate decompression amounts based on a corresponding pixel value or pixel values of each region of the plurality of regions according to the power curve. In one embodiment, decompression is performed using a PWL function generated based on the power curve using curve fitting techniques. In implementations, the pixel value(s) of a region of the image may refer to a luminance value of the region of the image, as explained in more details herein.

In one embodiment, at operation 230, the processing logic applies a first decompression amount to a first region of the compressed image having a first pixel value according to the power curve. In an implementation, the first pixel value of the first region of the image may refer to a luminance value of the first region of the image, as explained in more details herein.

In one embodiment, at operation 240, the processing logic applies a second decompression amount to a second region of the compressed image having a higher second pixel value according to the power curve. In embodiments, after decompression a residual level of compression of the second region is greater than a residual level of compression of the first region. In one embodiment, the first decompression amount is lower than the second decompression amount. In one embodiment, the second decompression amount is lower than the first decompression amount. In an implementation, the second pixel value of the second region of the image may refer to a luminance value of the second region of the image that is higher than the first luminance value of the first region.

Figure 3:
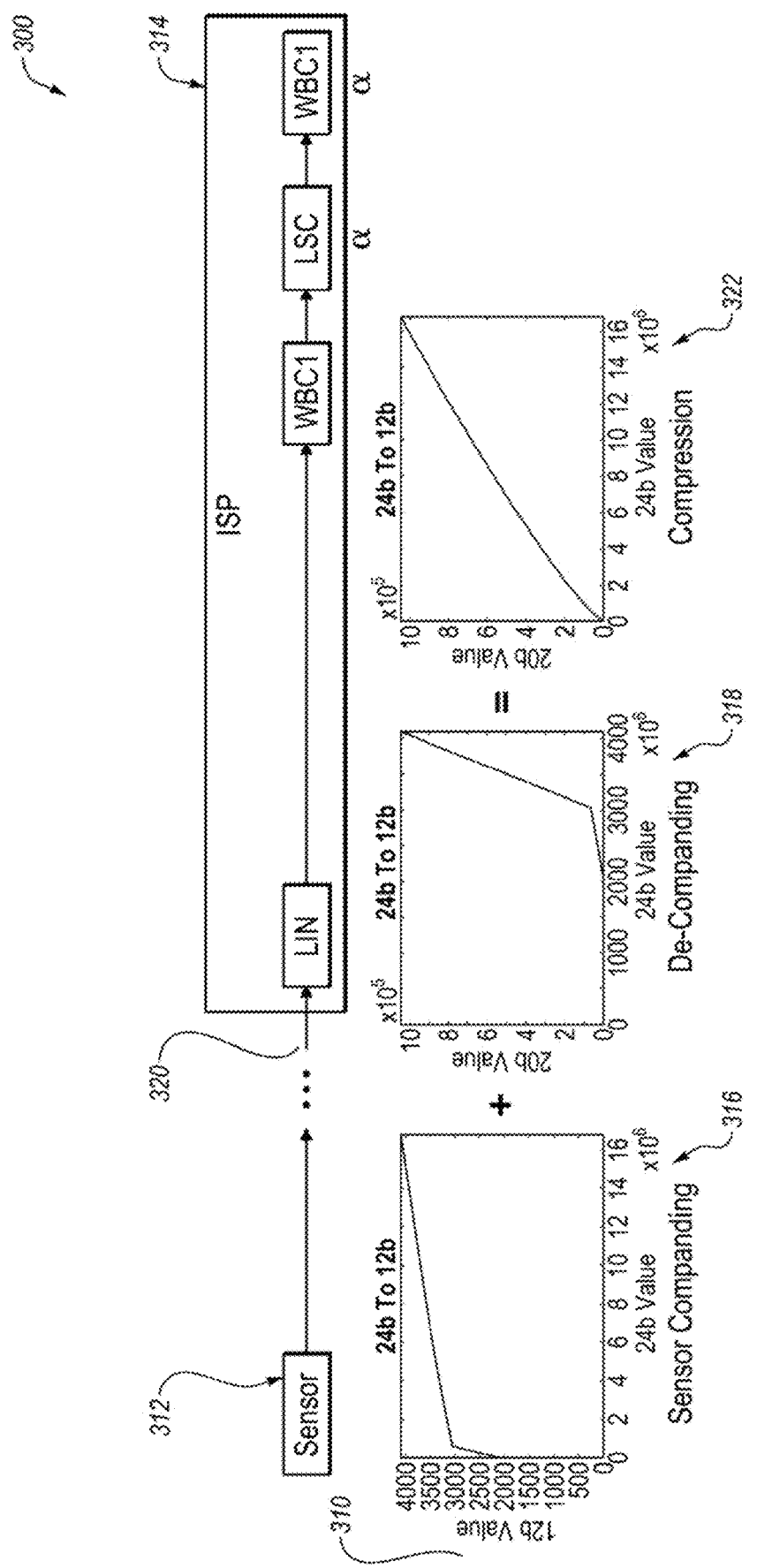
FIG. 3 is a diagram of computing environment 300 for compressing and decompressing an image from a camera sensor using power curves, in accordance with at least one embodiment.

FIG. 3 is a diagram of computing environment 300 for compressing and decompressing an image from a camera sensor using power curves (e.g., using PWL functions fit to the power curves), in accordance with at least one embodiment. In at least one embodiment, a processing logic may utilize a piecewise linear function (PWL) for performing compression and decompression of image data based on a power curve that corresponds to the PWL function. In this case, a captured image is first compressed by the camera sensor 312 using a PWL function and then the compressed image is decompressed using the another PWL function (e.g., an approximate inverse PWL function to the PWL function used for compression) at ISP 314 to achieve a bit depth associated with ISP 314. The PWL function used for the decompression may be selected such that when it is applied to the compressed image a resulting partially compressed image has a compression state that corresponds to a power curve in embodiments. Computing environment 300 may be the same or similar to computer system 100 of FIG. 1, sensor 312 may be the same or similar to camera sensor 130 of FIG. 1, and ISP 314 may be the same or similar to ISP 140 of FIG. 1.

At operation 310, the processing logic executes a compression algorithm at sensor 312 to compress a captured image from a first bit-depth (e.g., 24 bits), which is the bit depth of sensor 312 to a second bit depth (e.g., 12 bits) using PWL function 316 (which may or may not be based on a power curve). The processing logic may compress the raw image (e.g., of 24 bits) to a compressed image (e.g., of 12 bits) to enable faster and more efficient transfer of image data from sensor 312 to ISP 314. In an implementation, the processing logic may utilize a PWL compression equation at sensor 312 to compress 24-bits linear data (X) to 12-bits data (Y) using the equation:

$$Y=PWL_{sensor}(X),$$

where $PWL_{sensor}$ represents a piecewise linear equation used by sensor 312 for compressing data (X).

At operation 320, the processing logic transmits the compressed image to ISP 314. In implementations, ISP 314 may perform image processing and correction functions on a received image including linearization (LIN), black level correction (BLC), lenses shading correction (LSC), and white balance correction (WBC). In implementations, when the processing logic determines that the bit depth of ISP 314 is a third bit depth that is below the original bit-depth of the raw image but above the compressed bit-depth (e.g., an intermediate bit-depth of 20 bits), the processing logic applies PWL decompression on data (Y) from sensor 312 to generate partially de-compressed data (e.g., 20-bit data) (Z) using PWL function 318 (which may or may be based on a power curve), which generates an image represented by data (Z) that can be processed by a remainder of ISP 314. The final image may have a new compressed state (e.g., a partially compressed state) that has a lower compression than the initially compressed state. In the new compressed state, the amount of compression for each pixel may be based on a luminance or radiance value for that pixel. The new compressed state may correspond to the power curve 322.

The processing logic may generate data (Z) using the equation:

$$Z=PWL_{isp}(Y),$$

where $PWL_{isp}$ represents a piecewise linear equation used by ISP 314 for decompressing data (Y). Accordingly, by combining the above two equations, processing logic uses the following equation for generating a new bit-depth image (e.g., a 20 bit image) for use by ISP 314 from an original bit-depth image (e.g., a 24 bit image) that is generated by sensor 312. The equation below uses power curve 322 for converting an original bit-depth image (e.g., a 24 bit image) to a new bit-depth image (e.g., 20 bit image):

$$Z=PWL_{isp}(PWL_{sensor}(X))$$

The PWL processing may be performed in such a way that it approximates the following power function:

$$z \approx X^{\alpha},$$

where $\alpha$ may be a value that defines the power of the curve. As set forth below, the PWL processing may be performed in such a way that it approximates the following generalized power function:

$$Z \approx \beta X^{\alpha},$$

where $\alpha$ and $\beta$ parameters (e.g., number values) that define the power curve.

Thus, the final compressed state of the image that is processed by a remainder of the ISP 314 has a form that approximates the power curve 322. The power curve 322 shows the ultimate final target compressed states of regions of the image according to their associated luminance values (e.g., where a higher level of compression is applied to those regions having higher luminance values). This power curve 322 arrangement of the final compressed state of the image is achieved based on a combination of the PWL compression (e.g., using PWL function 316) and PWL decompression (e.g., using PWL function 318). Effectively, the final compressed state shown at power curve 322 can be achieved by multiplying the PWL function 316 with the PWL function 318. During design of the compression and/or decompression stages, the compression and/or decompression stages may be solved for by multiplying or dividing the final compressed state (e.g., according to power curve 322) by/with either of the compression or decompression PWL functions to arrive at the other of the compression or decompression functions. Thus processing logic can accurately determine what each of the knee points of the PWL function to use for compression and/or decompression should be.

In an implementation, given that the PWL processing is determined based on knee-points of the sensor PWL compression and the knee-points of the ISP PWL decompression functions based on curve fitting techniques of corresponding power curves, these compression and decompression algorithms can result in high quantization noise for low signal levels (e.g., low pixel values). The high quantization noise can negatively impact SNR and color accuracy for low pixel values. In this case, in order to preserve SNR and color accuracy, the processing logic may use a modified power curve that includes a linear segment in the beginning, such that compression and decompression is prevented for low power values that are within the linear segment of the power curve. The modified power function for generating data (Z) may be represented by:

$$Z=BX_\alpha,$$

where $\beta$ is a constant added to the power curve to allow a linear region in the beginning of the curve. Accordingly, the following equation can be used to achieve 24-bit to 20-bit compression:

$$2^{20}=\beta(2^{24})^\alpha,$$

while the following equation can be used to achieve a linear segment in the low-signal region, e.g., power value of 512 or below:

$$512=\beta(512)^\alpha$$

Similar equations using different beginning and target bit-depth values (e.g., other than 24 bits and 20 bits) may also be used to solve for different power curves having tailored linear segments.

In some embodiments, auto white balancing (AWB) operations and/or lens shading correction (LSC) operations have the form of gain*X and a power scaled according to $gain^\alpha$, which preserves color ratios.

Figure 4:
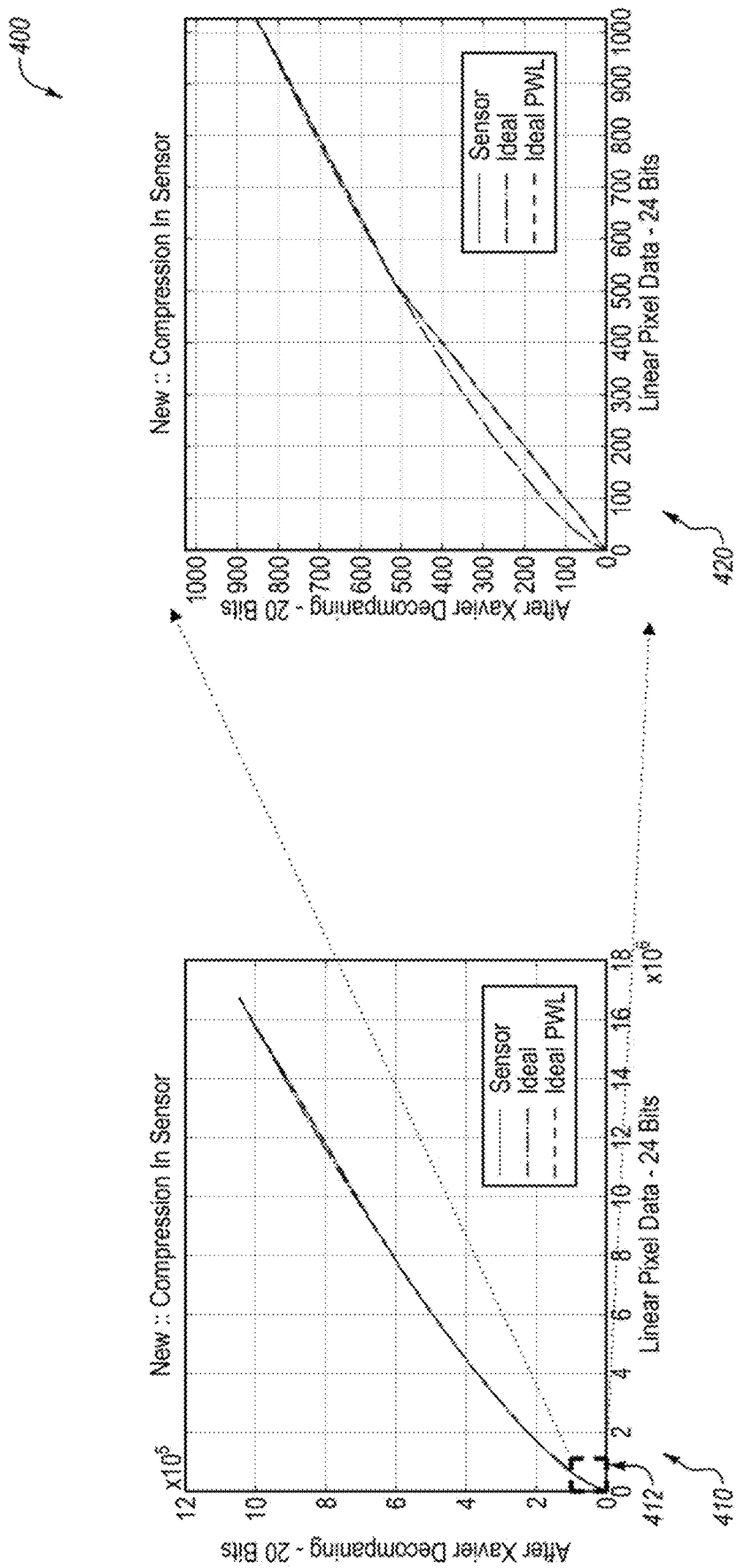
FIG. 4 illustrates a power curve with a linear segment that can be used for compressing and decompressing HDR images from a camera without impacting SNR and color accuracy of the image, in accordance with at least one embodiment.

FIG. 4 illustrates a power curve with a linear segment that can be used for compressing and/or decompressing images (e.g., such as HDR images) from a camera without impacting SNR and color accuracy of the image, in accordance with at least one embodiment. In at least one embodiment, a processing logic implementing process 400 may utilize power curve 410 that includes the linear segment 412 for compressing and/or decompressing HDR images based on pixel values of regions of the image. In certain implementations, the linear segment 412 in power curve 410 can be used for pixel values at or below 512. The use of a linear segment for pixel values below 512 can prevent compression and/or decompression of the regions having these pixel values, thus preventing SNR degradation for low pixel values (e.g., low signal levels) without causing color inaccuracies.

As show in FIG. 4, power curve 420 represents a bigger scale graph of linear segment 412, illustrating that pixel values of a 24 bit image up to a value of 512 can be converted to 20 bit pixel value in a linear fashion, optionally preventing any actual compression or decompression of the image, as explained in more details herein.

Figure 5:
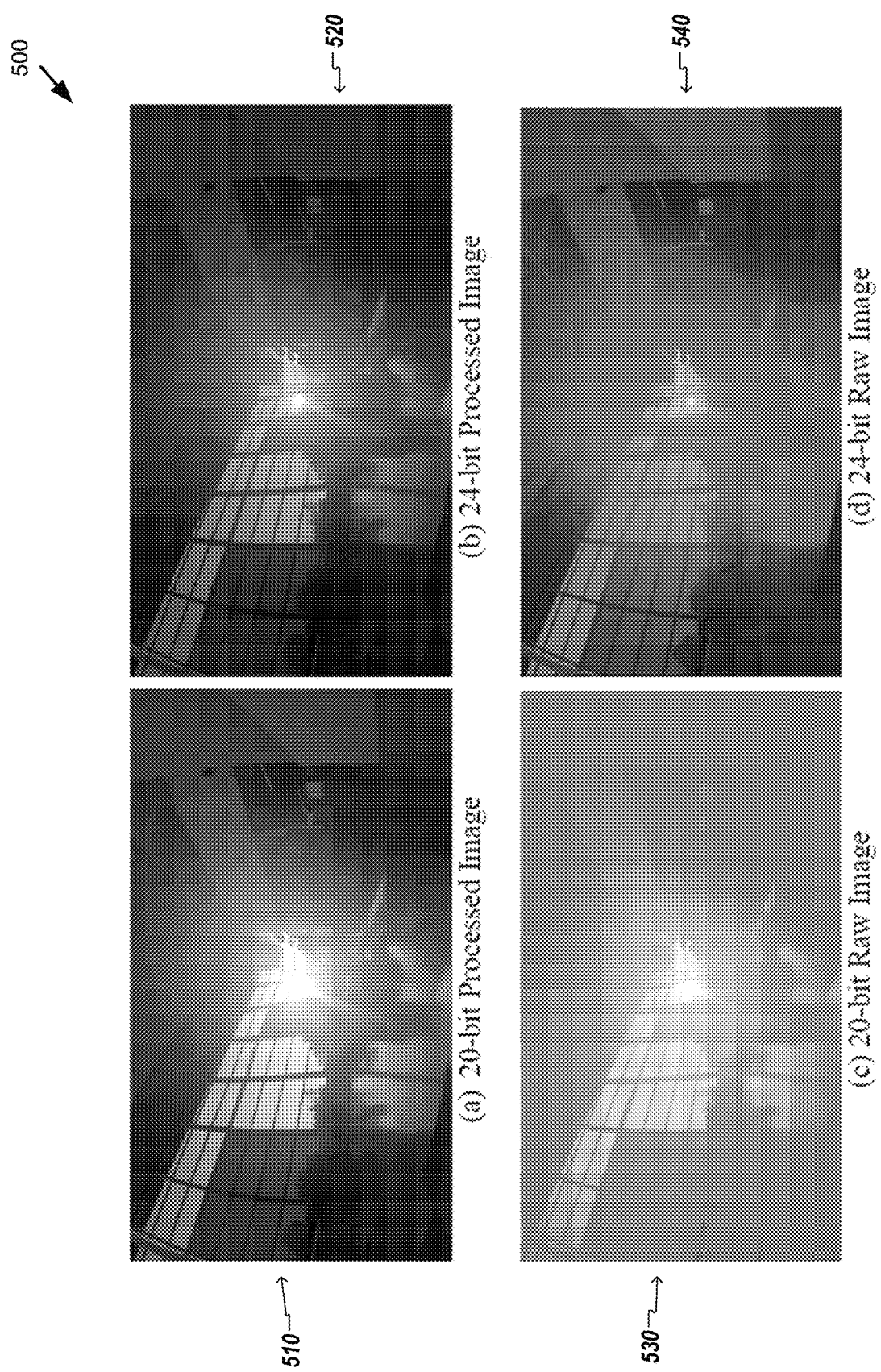
FIG. 5 illustrates the impact of using PWL compression and decompression of HDR row images from a camera and HDR processed images from an ISP, in accordance with at least one embodiment.

FIG. 5 illustrates the impact of using PWL compression and decompression of HDR raw images from a camera and HDR processed images from an ISP, in accordance with at least one embodiment. As shown in FIG. 5, image 510 was generated using a 20 bit camera sensor and processed using a 20 bit ISP. Image 520 shows the same image as image 510, but image 520 was captured by a 24 bit sensor and processed by a 20 bit ISP using one or more of the disclosed implementations. As shown in FIG. 5, image 520 shows less saturation at high power values compared to image 510, even though the final bit-depth that is shown is the same.

Image 530 represents a raw image that was generated using a 20 bit camera sensor before being processed. Image 540 shows the same image as image 530, but image 540 is a raw image that was captured by a 24 bit camera sensor. As shown, both of the raw images 530, 540 show much more saturation than the processed images that were processed according to embodiments described herein.

Data Center

Figure 6:
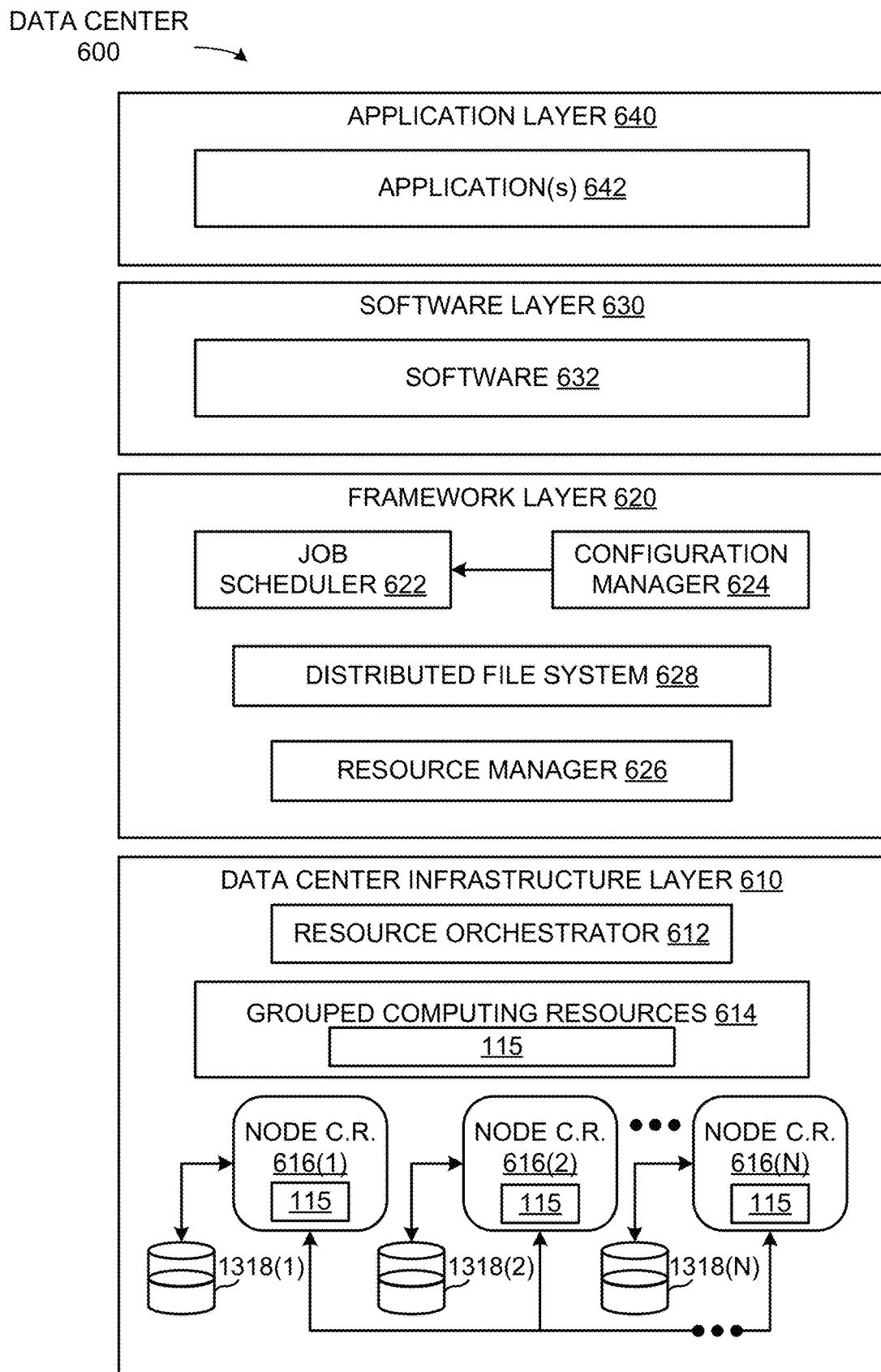
FIG. 6 illustrates an example data center, in which at least one embodiment may be used.

FIG. 6 illustrates an example data center 600, in which at least one embodiment may be used. In embodiments, the example data center 600 may be used to determine optimal power curves and PWL functions to use for compression and/or decompression. Data center 600 may, for example, perform curve fitting operations to determine one or more PWL functions for compression and/or decompression that map to a power curve and/or that cause a compressed image to be compressed according to a power curve and/or in a manner that corresponds to a power curve. In at least one embodiment, data center 600 includes a data center infrastructure layer 610, a framework layer 620, a software layer 630 and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents a positive integer (which may be a different integer "N" than used in other figures). In at least one embodiment, node C.R.s 616(1)-616(N) may include, but are not limited to, any number of central processing units ("CPUs") or other processors (including accelerators, field programmable gate arrays (FPGAs), graphics processors, etc.), memory storage devices 618(1)-618(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). In at least one embodiment, separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator 112 may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resources 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer 620. In at least one embodiment, one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer 620. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

Camera image compression/decompression component 115 may be used to provide compression and/or decompression schemes for high dynamic range (HDR) images in an image signal processing (ISP) pipeline, according to one or more embodiments. Details regarding camera image compression/decompression component 115 are provided herein in conjunction with FIG. 1. In at least one embodiment, camera image compression/decompression component 115 may be used in FIG. 6 for performing compression and decompression of HDR images as described herein.

Autonomous Vehicle

Though not limited to autonomous vehicles, embodiments of the present disclosure can be particularly effective when applied to images generated by cameras of autonomous vehicles. Cameras on an automobile may be expected to generate accurate images both in direct sunlight (e.g., having measured values of hundreds to thousands of lux) and in a moonless and starless night (e.g., having measured values of a fraction of a lux). Accordingly, the cameras of an automobile may be expected to accurately generate images in a wide range of environments that may vary in luminance values (measured in lux) by up to about eight orders of magnitude between environment extremes. Traditionally, the cameras are able to take accurate images that span this wide range of environments by performing auto white balancing and automatically switching between day and night modes, each of which has different camera settings. This enables the camera and ISP to remain at a relatively low bit-depth, where the camera and ISP may have the same bit-depth. In embodiments, an HDR camera can be used with a lower bit-depth ISP. The HDR camera may compress images, which may be partially decompressed at the ISP. The compression and/or decompression may be performed according to a power curve (optionally with a linear segment), and may preserve color rations and SNR. By implementing embodiments of the present disclosure, the image sensor and ISP can work together to generate final processed images that don't saturate in bright light and that don't lose data in dark light, while minimizing bandwidth requirements for transmitting data between the image sensor and ISP and maintaining the ISP at a lower bit-depth than the image sensor.

Figure 7A:
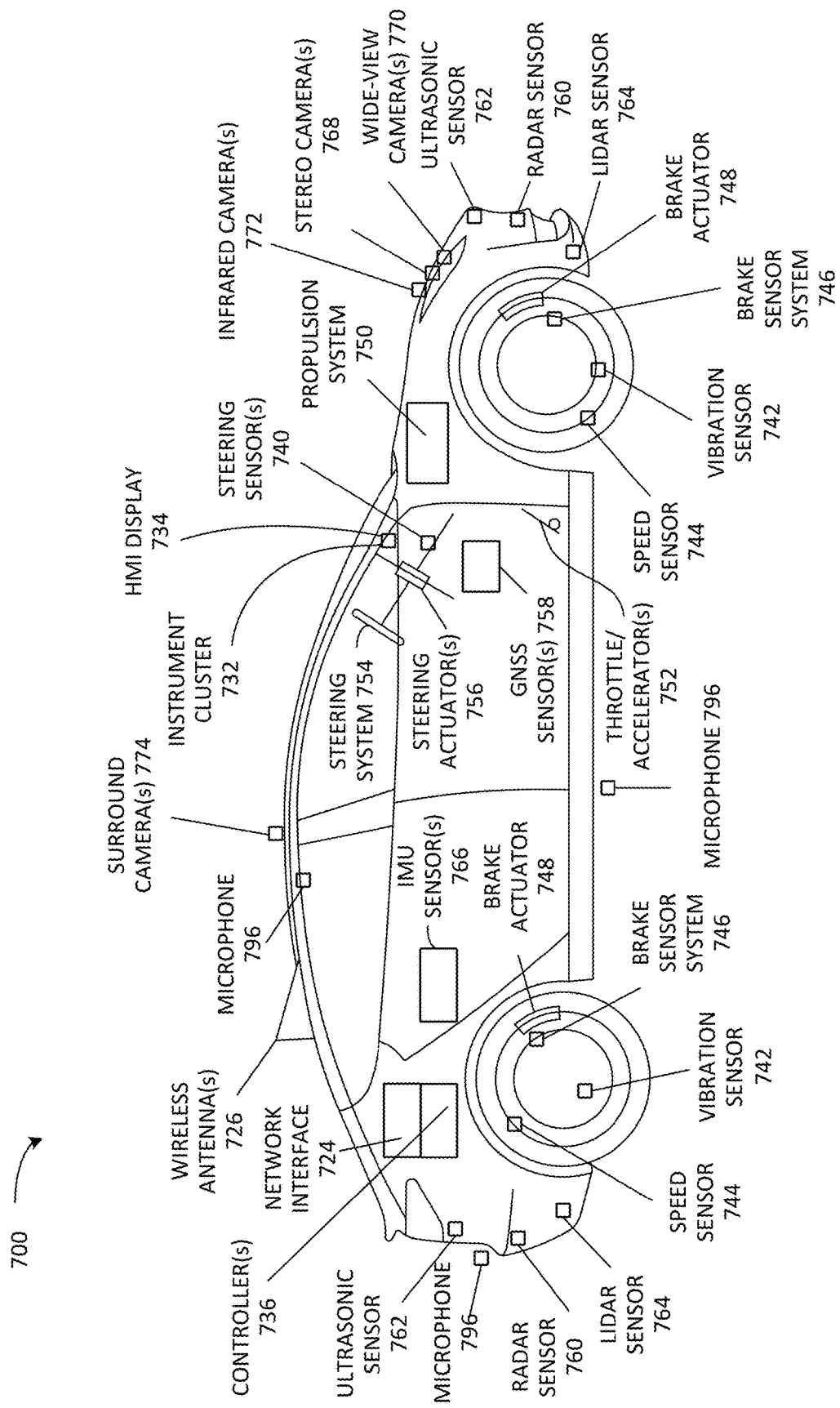
FIG. 7A illustrates an example of an autonomous vehicle, according to at least one embodiment.

FIG. 7A illustrates an example of an autonomous vehicle 700, according to at least one embodiment. In at least one embodiment, autonomous vehicle 700 (alternatively referred to herein as "vehicle 700") may be, without limitation, a passenger vehicle, such as a car, a truck, a bus, and/or another type of vehicle that accommodates one or more passengers. In at least one embodiment, vehicle 700 may be a semi-tractor-trailer truck used for hauling cargo. In at least one embodiment, vehicle 700 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 700 may be capable of functionality in accordance with one or more of Level 1 through Level 5 of autonomous driving levels. For example, in at least one embodiment, vehicle 700 may be capable of conditional automation (Level 3), high automation (Level 4), and/or full automation (Level 5), depending on embodiment.

In at least one embodiment, vehicle 700 may include, without limitation, components such as a chassis, a vehicle body, wheels (e.g., 2, 4, 6, 8, 18, etc.), tires, axles, and other components of a vehicle. In at least one embodiment, vehicle 700 may include, without limitation, a propulsion system 750, such as an internal combustion engine, hybrid electric power plant, an all-electric engine, and/or another propulsion system type. In at least one embodiment, propulsion system 750 may be connected to a drive train of vehicle 700, which may include, without limitation, a transmission, to enable propulsion of vehicle 700. In at least one embodiment, propulsion system 750 may be controlled in response to receiving signals from a throttle/accelerator(s) 752.

In at least one embodiment, a steering system 754, which may include, without limitation, a steering wheel, is used to steer vehicle 700 (e.g., along a desired path or route) when propulsion system 750 is operating (e.g., when vehicle 700 is in motion). In at least one embodiment, steering system 754 may receive signals from steering actuator(s) 756. In at least one embodiment, a steering wheel may be optional for full automation (Level 5) functionality. In at least one embodiment, a brake sensor system 746 may be used to operate vehicle brakes in response to receiving signals from brake actuator(s) 748 and/or brake sensors.

In at least one embodiment, controller(s) 736, which may include, without limitation, one or more system on chips ("SoCs") (not shown in FIG. 7A) and/or graphics processing unit(s) ("GPU(s)"), provide signals (e.g., representative of commands) to one or more components and/or systems of vehicle 700. For instance, in at least one embodiment, controller(s) 736 may send signals to operate vehicle brakes via brake actuator(s) 748, to operate steering system 754 via steering actuator(s) 756, to operate propulsion system 750 via throttle/accelerator(s) 752. In at least one embodiment, controller(s) 736 may include one or more onboard (e.g., integrated) computing devices that process sensor signals, and output operation commands (e.g., signals representing commands) to enable autonomous driving and/or to assist a human driver in driving vehicle 700. In at least one embodiment, controller(s) 736 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 736 provide signals for controlling one or more components and/or systems of vehicle 700 in response to sensor data received from one or more sensors (e.g., sensor inputs). In at least one embodiment, sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit ("IMU") sensor(s) 766 (e.g., accelerometer(s), gyroscope(s), a magnetic compass or magnetic compasses, magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range cameras (not shown in FIG. 7A), mid-range camera(s) (not shown in FIG. 7A), speed sensor(s) 744 (e.g., for measuring speed of vehicle 700), vibration sensor(s) 742, steering sensor(s) 740, brake sensor(s) (e.g., as part of brake sensor system 746), and/or other sensor types.

In at least one embodiment, one or more of controller(s) 736 may receive inputs (e.g., represented by input data) from an instrument cluster 732 of vehicle 700 and provide outputs (e.g., represented by output data, display data, etc.) via a human-machine interface ("HMI") display 734, an audible annunciator, a loudspeaker, and/or via other components of vehicle 700. In at least one embodiment, outputs may include information such as vehicle velocity, speed, time, map data (e.g., a High Definition map (not shown in FIG. 7A), location data (e.g., vehicle's 700 location, such as on a map), direction, location of other vehicles (e.g., an occupancy grid), information about objects and status of objects as perceived by controller(s) 736, etc. For example, in at least one embodiment, HMI display 734 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 700 further includes a network interface 724 which may use wireless antenna(s) 726 and/or modem(s) to communicate over one or more networks. For example, in at least one embodiment, network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 726 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Camera image compression/decompression component 115 may be used to provide compression and/or decompression schemes for high dynamic range (HDR) images in image signal processing (ISP), according to one or more embodiments. Camera image compression/decompression component 115 may be executed on a processor of the vehicle 700, such as on a CPU, GPU, SoC, etc. of vehicle 700. Details regarding camera image compression/decompression component 115 are provided herein in conjunction with FIG. 1. In at least one embodiment, camera image compression/decompression component 115 may be used in system FIG. 7A for performing compression and/or decompression of HDR images as described herein.

Figure 7B:
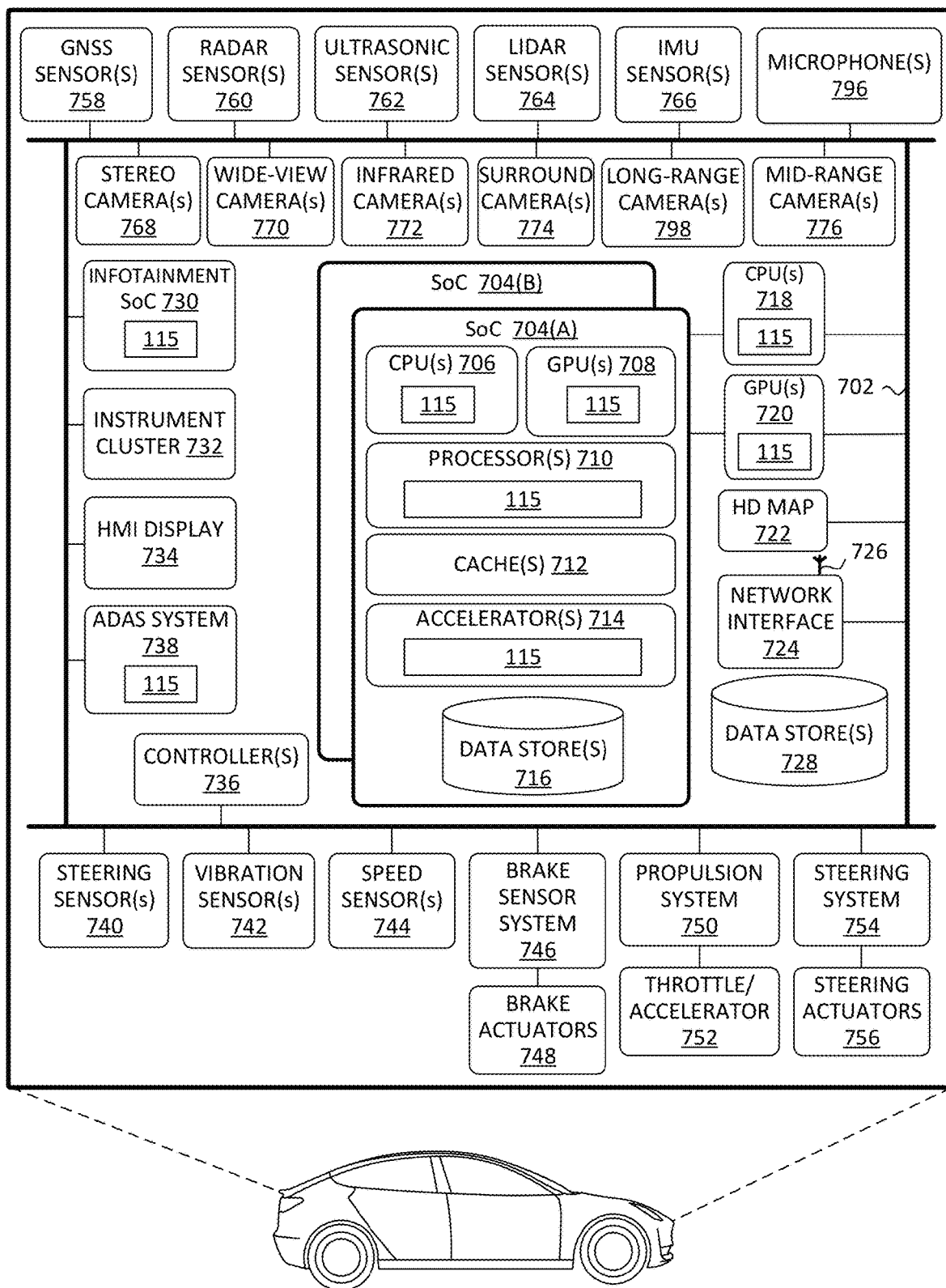
FIG. 7B is a diagram illustrating a system for communication between cloud-based server(s) and the autonomous vehicle of FIG. 7A, according to at least one embodiment.

FIG. 7B is a block diagram illustrating an example system architecture for autonomous vehicle 700 of FIG. 7A, according to at least one embodiment. In at least one embodiment, each of components, features, and systems of vehicle 700 in FIG. 7B is illustrated as being connected via a bus 702. In at least one embodiment, bus 702 may include, without limitation, a CAN data interface (alternatively referred to herein as a "CAN bus"). In at least one embodiment, a CAN may be a network inside vehicle 700 used to aid in control of various features and functionality of vehicle 700, such as actuation of brakes, acceleration, braking, steering, windshield wipers, etc. In at least one embodiment, bus 702 may be configured to have dozens or even hundreds of nodes, each with its own unique identifier (e.g., a CAN ID). In at least one embodiment, bus 702 may be read to find steering wheel angle, ground speed, engine revolutions per minute ("RPMs"), button positions, and/or other vehicle status indicators. In at least one embodiment, bus 702 may be a CAN bus that is ASIL B compliant.

In at least one embodiment, in addition to, or alternatively from CAN, FlexRay and/or Ethernet protocols may be used. In at least one embodiment, there may be any number of busses forming bus 702, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 702 may communicate with any of components of vehicle 700, and two or more busses of bus 702 may communicate with corresponding components. In at least one embodiment, each of any number of system(s) on chip(s) ("SoC(s)") 704 (such as SoC 704(A) and SoC 704(B), each of controller(s) 736, and/or each computer within vehicle may have access to same input data (e.g., inputs from sensors of vehicle 700), and may be connected to a common bus, such CAN bus.

In at least one embodiment, vehicle 700 may include one or more controller(s) 736, such as those described herein with respect to FIG. 7A. In at least one embodiment, controller(s) 736 may be used for a variety of functions. In at least one embodiment, controller(s) 736 may be coupled to any of various other components and systems of vehicle 700, and may be used for control of vehicle 700, artificial intelligence of vehicle 700, infotainment for vehicle 700, and/or other functions.

In at least one embodiment, vehicle 700 may include any number of SoCs 704. In at least one embodiment, each of SoCs 704 may include, without limitation, central processing units ("CPU(s)") 706, graphics processing units ("GPU(s)") 708, processor(s) 710, cache(s) 712, accelerator(s) 714, data store(s) 716, and/or other components and features not illustrated. In at least one embodiment, SoC(s) 704 may be used to control vehicle 700 in a variety of platforms and systems. For example, in at least one embodiment, SoC(s) 704 may be combined in a system (e.g., system of vehicle 700) with a High Definition ("HD") map 722 which may obtain map refreshes and/or updates via network interface 724 from one or more servers (not shown in FIG. 7B).

In at least one embodiment, CPU(s) 706 may include a CPU cluster or CPU complex (alternatively referred to herein as a "CCPLEX"). In at least one embodiment, CPU(s) 706 may include multiple cores and/or level two ("L2") caches. For instance, in at least one embodiment, CPU(s) 706 may include eight cores in a coherent multi-processor configuration. In at least one embodiment, CPU(s) 706 may include four dual-core clusters where each cluster has a dedicated L2 cache (e.g., a 2 megabyte (MB) L2 cache). In at least one embodiment, CPU(s) 706 (e.g., CCPLEX) may be configured to support simultaneous cluster operations enabling any combination of clusters of CPU(s) 706 to be active at any given time.

In at least one embodiment, one or more of CPU(s) 706 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 706 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 708 may include an integrated GPU (alternatively referred to herein as an "iGPU"). In at least one embodiment, GPU(s) 708 may be programmable and may be efficient for parallel workloads. In at least one embodiment, GPU(s) 708 may use an enhanced tensor instruction set. In at least one embodiment, GPU(s) 708 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 708 may include at least eight streaming microprocessors. In at least one embodiment, GPU(s) 708 may use compute application programming interface(s) (API(s)). In at least one embodiment, GPU(s) 708 may use one or more parallel computing platforms and/or programming models (e.g., NVIDIA's CUDA model).

In at least one embodiment, one or more of GPU(s) 708 may be power-optimized for best performance in automotive and embedded use cases. For example, in at least one embodiment, GPU(s) 708 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 708 may include a high bandwidth memory ("HBM") and/or a 16 GB high-bandwidth memory second generation ("HBM2") memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 708 may include unified memory technology. In at least one embodiment, address translation services ("ATS") support may be used to allow GPU(s) 708 to access CPU(s) 706 page tables directly. In at least one embodiment, embodiment, when a GPU of GPU(s) 708 memory management unit ("MMU") experiences a miss, an address translation request may be transmitted to CPU(s) 706. In response, 2 CPU of CPU(s) 706 may look in its page tables for a virtual-to-physical mapping for an address and transmit translation back to GPU(s) 708, in at least one embodiment. In at least one embodiment, unified memory technology may allow a single unified virtual address space for memory of both CPU(s) 706 and GPU(s) 708, thereby simplifying GPU(s) 708 programming and porting of applications to GPU(s) 708.

In at least one embodiment, GPU(s) 708 may include any number of access counters that may keep track of frequency of access of GPU(s) 708 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 704 may include any number of cache(s) 712, including those described herein. For example, in at least one embodiment, cache(s) 712 could include a level three ("L3") cache that is available to both CPU(s) 706 and GPU(s) 708 (e.g., that is connected to CPU(s) 706 and GPU(s) 708). In at least one embodiment, cache(s) 712 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 704 may include one or more accelerator(s) 714 (e.g., hardware accelerators, software accelerators, or a combination thereof). In at least one embodiment, SoC(s) 704 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 708 and to off-load some of tasks of GPU(s) 708 (e.g., to free up more cycles of GPU(s) 708 for performing other tasks). In at least one embodiment, accelerator(s) 714 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 714 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 708, and by using an inference accelerator, for example, a designer may target either DLA(s) or GPU(s) 708 for any function. For example, in at least one embodiment, a designer may focus processing of CNNs and floating point operations on DLA(s) and leave other functions to GPU(s) 708 and/or accelerator(s) 714.

In at least one embodiment, accelerator(s) 714 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 738, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 706. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 714 may include a computer vision network on-chip and static random-access memory ("SRAM"), for providing a high-bandwidth, low latency SRAM for accelerator(s) 714. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 704 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 714 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 700, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 766 that correlates with vehicle 700 orientation, distance, 3D location estimates of object obtained from neural network and/or other sensors (e.g., LIDAR sensor(s) 764 or RADAR sensor(s) 760), among others.

In at least one embodiment, one or more of SoC(s) 704 may include data store(s) 716 (e.g., memory). In at least one embodiment, data store(s) 716 may be on-chip memory of SoC(s) 704, which may store neural networks to be executed on GPU(s) 708 and/or a DLA. In at least one embodiment, data store(s) 716 may be large enough in capacity to store multiple instances of neural networks for redundancy and safety. In at least one embodiment, data store(s) 716 may comprise L2 or L3 cache(s).

In at least one embodiment, one or more of SoC(s) 704 may include any number of processor(s) 710 (e.g., embedded processors). In at least one embodiment, processor(s) 710 may include a boot and power management processor that may be a dedicated processor and subsystem to handle boot power and management functions and related security enforcement. In at least one embodiment, a boot and power management processor may be a part of a boot sequence of SoC(s) 704 and may provide runtime power management services. In at least one embodiment, a boot power and management processor may provide clock and voltage programming, assistance in system low power state transitions, management of SoC(s) 704 thermals and temperature sensors, and/or management of SoC(s) 704 power states. In at least one embodiment, each temperature sensor may be implemented as a ring-oscillator whose output frequency is proportional to temperature, and SoC(s) 704 may use ring-oscillators to detect temperatures of CPU(s) 706, GPU(s) 708, and/or accelerator(s) 714. In at least one embodiment, if temperatures are determined to exceed a threshold, then a boot and power management processor may enter a temperature fault routine and put SoC(s) 704 into a lower power state and/or put vehicle 700 into a chauffeur to safe stop mode (e.g., bring vehicle 700 to a safe stop).

In at least one embodiment, processor(s) 710 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 710 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 710 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 710 may further include a real-time camera engine that may include, without limitation, a dedicated processor subsystem for handling real-time camera management. In at least one embodiment, processor(s) 710 may further include a high-dynamic range signal processor that may include, without limitation, an image signal processor that is a hardware engine that is part of a camera processing pipeline.

In at least one embodiment, processor(s) 710 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 770, surround camera(s) 774, and/or on in-cabin monitoring camera sensor(s). In at least one embodiment, in-cabin monitoring camera sensor(s) are preferably monitored by a neural network running on another instance of SoC 704, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 708 are not required to continuously render new surfaces. In at least one embodiment, when GPU(s) 708 are powered on and active doing 3D rendering, a video image compositor may be used to offload GPU(s) 708 to improve performance and responsiveness.

In at least one embodiment, one or more SoC of SoC(s) 704 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 704 may further include an input/output controller(s) that may be controlled by software and may be used for receiving I/O signals that are uncommitted to a specific role.

In at least one embodiment, one or more of SoC(s) 704 may further include a broad range of peripheral interfaces to enable communication with peripherals, audio encoders/decoders ("codecs"), power management, and/or other devices. In at least one embodiment, SoC(s) 704 may be used to process data from cameras (e.g., connected over Gigabit Multimedia Serial Link and Ethernet channels), sensors (e.g., LIDAR sensor(s) 764, RADAR sensor(s) 760, etc. that may be connected over Ethernet channels), data from bus 702 (e.g., speed of vehicle 700, steering wheel position, etc.), data from GNSS sensor(s) 758 (e.g., connected over a Ethernet bus or a CAN bus), etc. In at least one embodiment, one or more SoC of SoC(s) 704 may further include dedicated high-performance mass storage controllers that may include their own DMA engines, and that may be used to free CPU(s) 706 from routine data management tasks.

In at least one embodiment, SoC(s) 704 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 704 may be faster, more reliable, and even more energy-efficient and space-efficient than conventional systems. For example, in at least one embodiment, accelerator(s) 714, when combined with CPU(s) 706, GPU(s) 708, and data store(s) 716, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 720) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 708.

In at least one embodiment, a CNN for facial recognition and vehicle owner identification may use data from camera sensors to identify presence of an authorized driver and/or owner of vehicle 700. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 704 provide for security against theft and/or carjacking.

In at least one embodiment, a CNN for emergency vehicle detection and identification may use data from microphones 796 to detect and identify emergency vehicle sirens. In at least one embodiment, SoC(s) 704 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 758. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 762, until emergency vehicles pass.

In at least one embodiment, vehicle 700 may include CPU(s) 718 (e.g., discrete CPU(s), or dCPU(s)), that may be coupled to SoC(s) 704 via a high-speed interconnect (e.g., PCIe). In at least one embodiment, CPU(s) 718 may include an X86 processor, for example. CPU(s) 718 may be used to perform any of a variety of functions, including arbitrating potentially inconsistent results between ADAS sensors and SoC(s) 704, and/or monitoring status and health of controller(s) 736 and/or an infotainment system on a chip ("infotainment SoC") 730, for example.

In at least one embodiment, vehicle 700 may include GPU(s) 720 (e.g., discrete GPU(s), or dGPU(s)), that may be coupled to SoC(s) 704 via a high-speed interconnect (e.g., NVIDIA's NVLINK channel). In at least one embodiment, GPU(s) 720 may provide additional artificial intelligence functionality, such as by executing redundant and/or different neural networks, and may be used to train and/or update neural networks based at least in part on input (e.g., sensor data) from sensors of a vehicle 700.

In at least one embodiment, vehicle 700 may further include network interface 724 which may include, without limitation, wireless antenna(s) 726 (e.g., one or more wireless antennas for different communication protocols, such as a cellular antenna, a Bluetooth antenna, etc.). In at least one embodiment, network interface 724 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 700 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 700 information about vehicles in proximity to vehicle 700 (e.g., vehicles in front of, on a side of, and/or behind vehicle 700). In at least one embodiment, such aforementioned functionality may be part of a cooperative adaptive cruise control functionality of vehicle 700.

In at least one embodiment, network interface 724 may include an SoC that provides modulation and demodulation functionality and enables controller(s) 736 to communicate over wireless networks. In at least one embodiment, network interface 724 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 700 may further include data store(s) 728 which may include, without limitation, off-chip (e.g., off SoC(s) 704) storage. In at least one embodiment, data store(s) 728 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 700 may further include GNSS sensor(s) 758 (e.g., GPS and/or assisted GPS sensors), to assist in mapping, perception, occupancy grid generation, and/or path planning functions. In at least one embodiment, any number of GNSS sensor(s) 758 may be used, including, for example and without limitation, a GPS using a Universal Serial Bus ("USB") connector with an Ethernet-to-Serial (e.g., RS-232) bridge.

In at least one embodiment, vehicle 700 may further include RADAR sensor(s) 760. In at least one embodiment, RADAR sensor(s) 760 may be used by vehicle 700 for long-range vehicle detection, even in darkness and/or severe weather conditions. In at least one embodiment, RADAR functional safety levels may be ASIL B. In at least one embodiment, RADAR sensor(s) 760 may use a CAN bus and/or bus 702 (e.g., to transmit data generated by RADAR sensor(s) 760) for control and to access object tracking data, with access to Ethernet channels to access raw data in some examples. In at least one embodiment, a wide variety of RADAR sensor types may be used. For example, and without limitation, RADAR sensor(s) 760 may be suitable for front, rear, and side RADAR use. In at least one embodiment, one or more sensor of RADAR sensors(s) 760 is a Pulse Doppler RADAR sensor.

In at least one embodiment, RADAR sensor(s) 760 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 760 may help in distinguishing between static and moving objects, and may be used by ADAS system 738 for emergency brake assist and forward collision warning. In at least one embodiment, sensors 760(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 700 surroundings at higher speeds with minimal interference from traffic in adjacent lanes. In at least one embodiment, another two antennae may expand field of view, making it possible to quickly detect vehicles entering or leaving a lane of vehicle 700.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 760 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 738 for blind spot detection and/or lane change assist.

In at least one embodiment, vehicle 700 may further include ultrasonic sensor(s) 762. In at least one embodiment, ultrasonic sensor(s) 762, which may be positioned at a front, a back, and/or side location of vehicle 700, may be used for parking assist and/or to create and update an occupancy grid. In at least one embodiment, a wide variety of ultrasonic sensor(s) 762 may be used, and different ultrasonic sensor(s) 762 may be used for different ranges of detection (e.g., 2.5 m, 4 m). In at least one embodiment, ultrasonic sensor(s) 762 may operate at functional safety levels of ASIL B.

In at least one embodiment, vehicle 700 may include LIDAR sensor(s) 764. In at least one embodiment, LIDAR sensor(s) 764 may be used for object and pedestrian detection, emergency braking, collision avoidance, and/or other functions. In at least one embodiment, LIDAR sensor(s) 764 may operate at functional safety level ASIL B. In at least one embodiment, vehicle 700 may include multiple LIDAR sensors 764 (e.g., two, four, six, etc.) that may use an Ethernet channel (e.g., to provide data to a Gigabit Ethernet switch).

In at least one embodiment, LIDAR sensor(s) 764 may be capable of providing a list of objects and their distances for a 360-degree field of view. In at least one embodiment, commercially available LIDAR sensor(s) 764 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 764 may include a small device that may be embedded into a front, a rear, a side, and/or a corner location of vehicle 700. In at least one embodiment, LIDAR sensor(s) 764, in such an embodiment, may provide up to a 120-degree horizontal and 35-degree vertical field-of-view, with a 200 m range even for low-reflectivity objects. In at least one embodiment, front-mounted LIDAR sensor(s) 764 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 700 up to approximately 200 m. In at least one embodiment, a flash LIDAR unit includes, without limitation, a receptor, which records laser pulse transit time and reflected light on each pixel, which in turn corresponds to a range from vehicle 700 to objects. In at least one embodiment, flash LIDAR may allow for highly accurate and distortion-free images of surroundings to be generated with every laser flash. In at least one embodiment, four flash LIDAR sensors may be deployed, one at each side of vehicle 700. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 700 may further include IMU sensor(s) 766. In at least one embodiment, IMU sensor(s) 766 may be located at a center of a rear axle of vehicle 700. In at least one embodiment, IMU sensor(s) 766 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 766 may include, without limitation, accelerometers and gyroscopes. In at least one embodiment, such as in nine-axis applications, IMU sensor(s) 766 may include, without limitation, accelerometers, gyroscopes, and magnetometers.

In at least one embodiment, IMU sensor(s) 766 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 766 may enable vehicle 700 to estimate its heading without requiring input from a magnetic sensor by directly observing and correlating changes in velocity from a GPS to IM sensor(s) 766. In at least one embodiment, IMU sensor(s) 766 and GNSS sensor(s) 758 may be combined in a single integrated unit.

In at least one embodiment, vehicle 700 may include microphone(s) 796 placed in and/or around vehicle 700. In at least one embodiment, microphone(s) 796 may be used for emergency vehicle detection and identification, among other things.

In at least one embodiment, vehicle 700 may further include any number of camera types, including stereo camera(s) 768, wide-view camera(s) 770, infrared camera(s) 772, surround camera(s) 774, long-range camera(s) 798, mid-range camera(s) 776, and/or other camera types. In at least one embodiment, cameras may be used to capture image data around an entire periphery of vehicle 700. In at least one embodiment, which types of cameras used depends on vehicle 700. In at least one embodiment, any combination of camera types may be used to provide necessary coverage around vehicle 700. In at least one embodiment, a number of cameras deployed may differ depending on embodiment. For example, in at least one embodiment, vehicle 700 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 7A.

In at least one embodiment, vehicle 700 may further include vibration sensor(s) 742. In at least one embodiment, vibration sensor(s) 742 may measure vibrations of components of vehicle 700, such as axle(s). For example, in at least one embodiment, changes in vibrations may indicate a change in road surfaces. In at least one embodiment, when two or more vibration sensors 742 are used, differences between vibrations may be used to determine friction or slippage of road surface (e.g., when a difference in vibration is between a power-driven axle and a freely rotating axle).

In at least one embodiment, vehicle 700 may include ADAS system 738. In at least one embodiment, ADAS system 738 may include, without limitation, an SoC, in some examples. In at least one embodiment, ADAS system 738 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 760, LIDAR sensor(s) 764, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 700 and automatically adjusts speed of vehicle 700 to maintain a safe distance from vehicles ahead. In at least one embodiment, a lateral ACC system performs distance keeping, and advises vehicle 700 to change lanes when necessary. In at least one embodiment, a lateral ACC is related to other ADAS applications, such as LC and CW.

In at least one embodiment, a CACC system uses information from other vehicles that may be received via network interface 724 and/or wireless antenna(s) 726 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 700), while I2V communication provides information about traffic further ahead. In at least one embodiment, a CACC system may include either or both I2V and V2V information sources. In at least one embodiment, given information of vehicles ahead of vehicle 700, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 760, coupled to a dedicated processor, digital signal processor ("DSP"), FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 760, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 700 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 700 if vehicle 700 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 700 is backing up. In at least one embodiment, an RCTW system includes an AEB system to ensure that vehicle brakes are applied to avoid a crash. In at least one embodiment, an RCTW system may use one or more rear-facing RADAR sensor(s) 760, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 700 itself decides, in case of conflicting results, whether to heed result from a primary computer or a secondary computer (e.g., a first controller or a second controller of controllers 736). For example, in at least one embodiment, ADAS system 738 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 738 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 704.

In at least one embodiment, ADAS system 738 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 738 may be fed into a primary computer's perception block and/or a primary computer's dynamic driving task block. For example, in at least one embodiment, if ADAS system 738 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 700 may further include infotainment SoC 730 (e.g., an in-vehicle infotainment system (IVI)). Although illustrated and described as an SoC, infotainment system SoC 730, in at least one embodiment, may not be an SoC, and may include, without limitation, two or more discrete components. In at least one embodiment, infotainment SoC 730 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 700. For example, infotainment SoC 730 could include radios, disk players, navigation systems, video players, USB and Bluetooth connectivity, carputers, in-car entertainment, WiFi, steering wheel audio controls, hands free voice control, a heads-up display ("HUD"), HMI display 734, a telematics device, a control panel (e.g., for controlling and/or interacting with various components, features, and/or systems), and/or other components. In at least one embodiment, infotainment SoC 730 may further be used to provide information (e.g., visual and/or audible) to user(s) of vehicle 700, such as information from ADAS system 738, autonomous driving information such as planned vehicle maneuvers, trajectories, surrounding environment information (e.g., intersection information, vehicle information, road information, etc.), and/or other information.

In at least one embodiment, infotainment SoC 730 may include any amount and type of GPU functionality. In at least one embodiment, infotainment SoC 730 may communicate over bus 702 with other devices, systems, and/or components of vehicle 700. In at least one embodiment, infotainment SoC 730 may be coupled to a supervisory MCU such that a GPU of an infotainment system may perform some self-driving functions in event that primary controller(s) 736 (e.g., primary and/or backup computers of vehicle 700) fail. In at least one embodiment, infotainment SoC 730 may put vehicle 700 into a chauffeur to safe stop mode, as described herein.

In at least one embodiment, vehicle 700 may further include instrument cluster 732 (e.g., a digital dash, an electronic instrument cluster, a digital instrument panel, etc.). In at least one embodiment, instrument cluster 732 may include, without limitation, a controller and/or supercomputer (e.g., a discrete controller or supercomputer). In at least one embodiment, instrument cluster 732 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 730 and instrument cluster 732. In at least one embodiment, instrument cluster 732 may be included as part of infotainment SoC 730, or vice versa.

Camera image compression/decompression component 115 may be used to provide compression and/or decompression schemes for high dynamic range (HDR) images in image signal processing (ISP), according to one or more embodiments. Camera image compression/decompression component 115 may be executed on a processor of the vehicle 700, such as on a CPU, GPU, SoC, etc. of vehicle 700. Details regarding camera image compression/decompression component 115 are provided herein in conjunction with FIG. 1. In at least one embodiment, camera image compression/decompression component 115 may be used in system FIG. 7B for performing compression and/or decompression of HDR images as described herein.

Computer Systems

Figure 8:
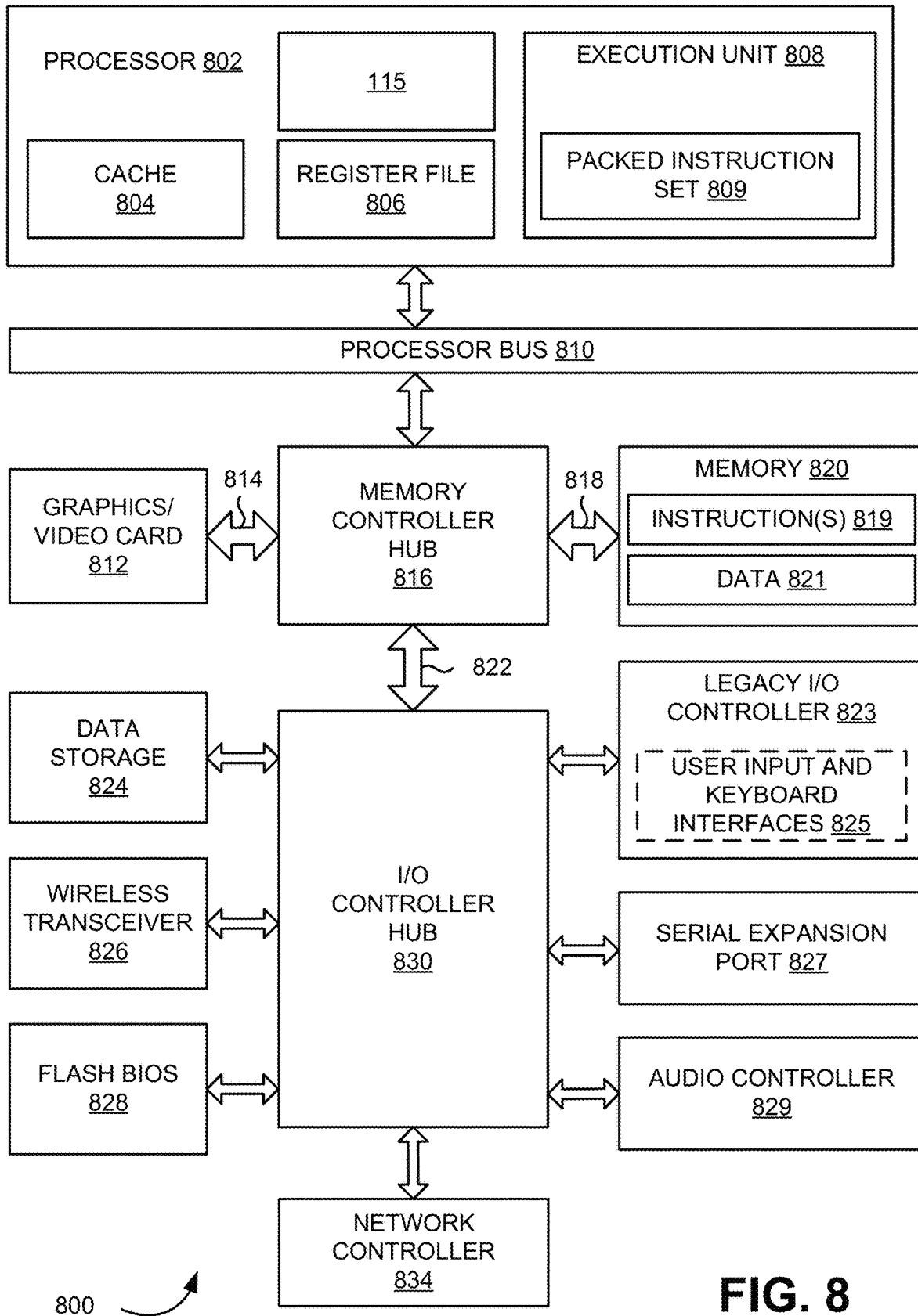
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In embodiments, the computer system may be used to determine optimal power curves and PWL functions to use for compression and/or decompression. The computer system may, for example, perform curve fitting operations to determine one or more PWL functions for compression and/or decompression that map to a power curve and/or that cause a compressed image to be compressed according to a power curve and/or in a manner that corresponds to a power curve. In embodiments, the computer system may perform one or more operations of an ISP. For example, the computer system may include a camera compression/decompression component of an ISP, which may decompress (e.g., partially decompress) an incoming compressed image in accordance with embodiments described herein and optionally perform one or more operations of an ISP, before optionally rendering an image and/or processing the image. Once the image is decompressed (e.g., partially decompressed) and fully processed by the ISP, the image may be used for one or more purposes. For example, the image may be input into one or more trained machine learning models, which may perform object identification and/or recognition and/or one or more other operations.

In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a DSP, system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC")

microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a USB port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Camera image compression/decompression component 115 may be used to provide compression and/or decompression schemes for high dynamic range (HDR) images in image signal processing (ISP), according to one or more embodiments. Details regarding camera image compression/decompression component 115 are provided herein in conjunction with FIG. 1. In at least one embodiment, camera image compression/decompression component 115 may be used in system FIG. 8 for performing compression and/or decompression of HDR images as described herein.

Figure 9:
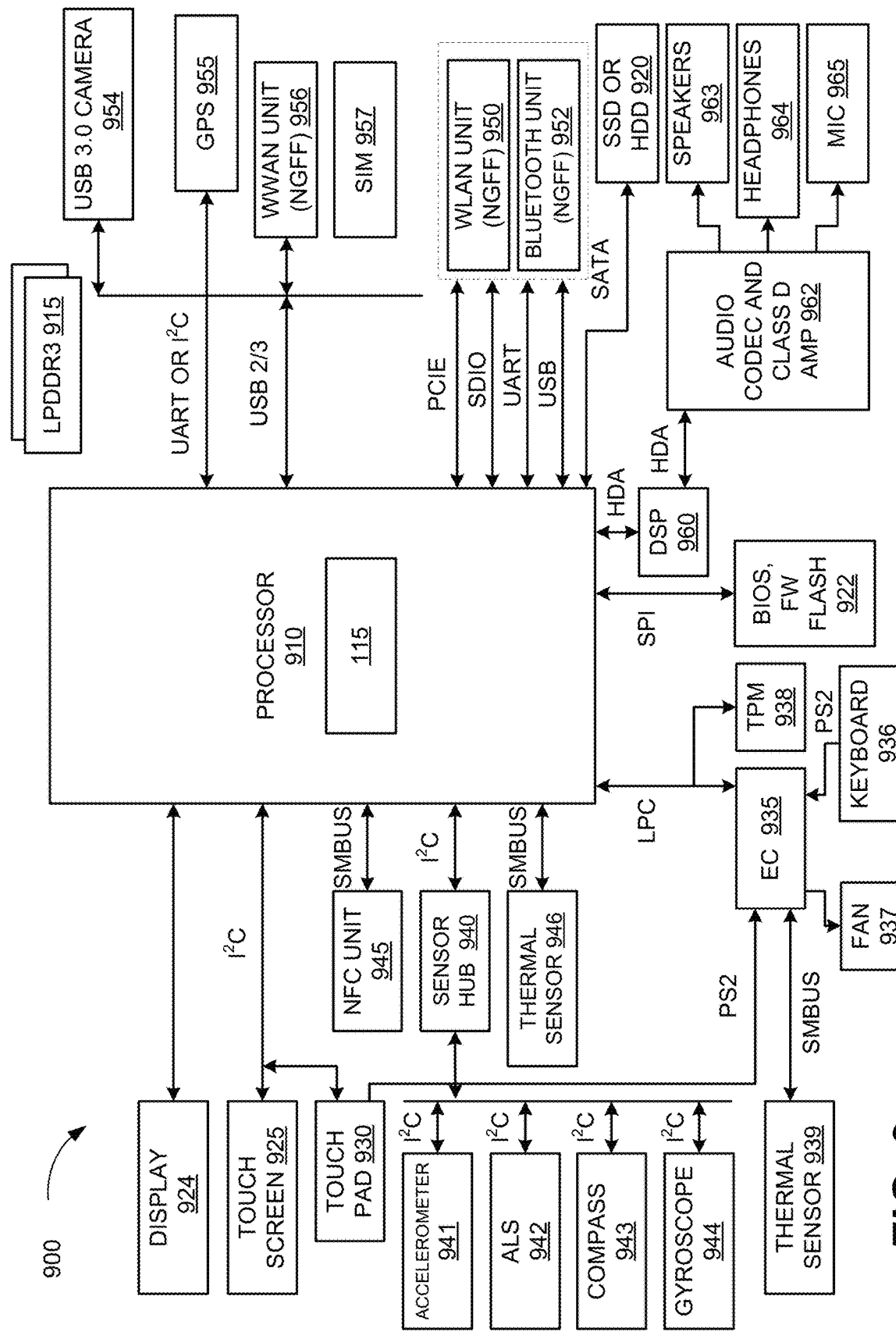
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I$^2$C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Camera image compression/decompression component 115 may be used to provide compression and/or decompression schemes for high dynamic range (HDR) images in an image signal processing (ISP), according to one or more embodiments. Details regarding camera image compression/decompression component 115 are provided herein in conjunction with FIG. 1. In at least one embodiment, camera image compression/decompression component 115 may be used in system FIG. 9 for performing compression and decompression of HDR images as described herein.

Figure 10:
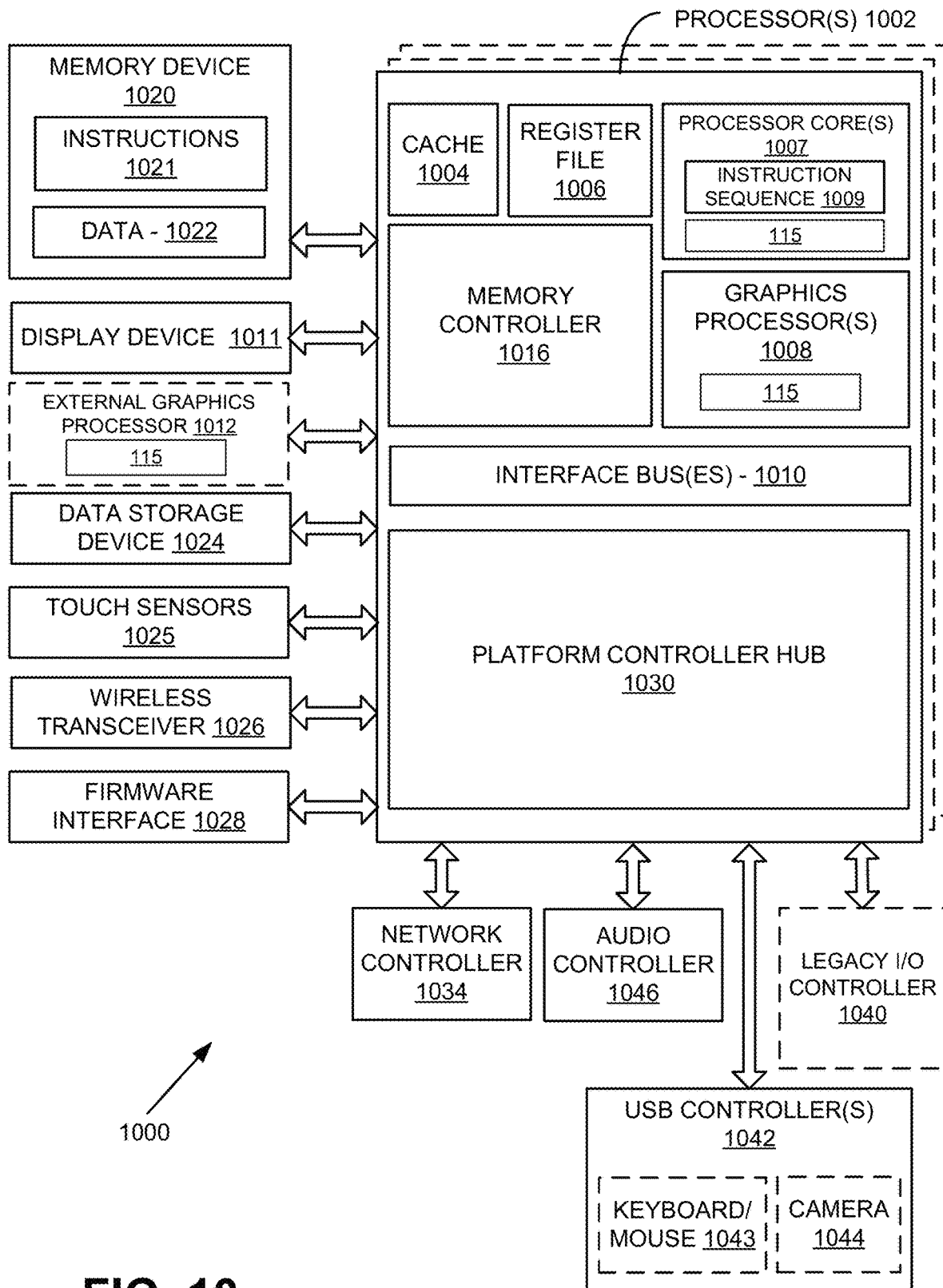
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, a smart phone, a tablet computing device or a mobile Internet device. In at least one embodiment, processing system 1000 can also include, couple with, or be integrated within a wearable device, such as a smart watch wearable device, a smart eyewear device, an augmented reality device, or a virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction sequence 1009. In at least one embodiment, instruction sequence 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction sequence 1009, which may include instructions to facilitate emulation of other instruction sequences. In at least one embodiment, processor core 1007 may also include other processing devices, such a Digital Signal Processor (DSP).

In at least one embodiment, processor 1002 includes a cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, a register file 1006 is additionally included in processor 1002, which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010 can be a processor bus, such as a version of a Direct Media Interface (DMI) bus. In at least one embodiment, interface bus 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, a memory device 1020 can be a dynamic random access memory (DRAM) device, a static random access memory (SRAM) device, flash memory device, phase-change memory device, or some other memory device having suitable performance to serve as process memory. In at least one embodiment, memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment, display device 1011 can include one or more of an internal display device, as in a mobile electronic device or a laptop device, or an external display device attached via a display interface (e.g., DisplayPort, etc.). In at least one embodiment, display device 1011 can include a head mounted display (TIMID) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system 1000. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Camera image compression component 115 are used to provide compression and decompression schemes for high dynamic range (HDR) images in Image signal processing (ISP), according to one or more embodiments. Details regarding camera image compression component 115 are provided herein in conjunction with FIG. 1. In at least one embodiment, camera image compression component 115 may be used in system 1000 for performing compression and decompression of HDR images as described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, at one or more processors associated with an image signal processing (ISP) pipeline, an image generated by an image sensor and captured at a first bit-depth associated with the image sensor, wherein the image is compressed to a second bit-depth that is lower than the first bit-depth, and wherein the ISP is associated with a third bit-depth that is lower than the first bit-depth and higher than the second bit-depth; and
   decompressing the compressed image according to a power curve to generate a partially decompressed image having the third bit-depth, wherein a plurality of regions of the partially decompressed image are decompressed to at least two decompression levels based on a corresponding pixel value of each region of the plurality of regions.

2. The method of claim 1, wherein the power curve comprises a linear segment that extends to a pixel value threshold for linearly processing pixel values that are below the pixel value threshold, and wherein processing pixel values based on the linear segment of the power curve comprises avoiding compressed states of the pixel values to preserve signal to noise ratio (SNR) of the pixel values.

3. The method of claim 1, wherein the decompressing of the compressed image according to the power curve preserves a color ratio of the compressed image and maintains a signal to noise ratio for the compressed image below a signal to noise ratio threshold.

4. The method of claim 1, wherein the power curve corresponds to a piece-wise linear (PWL) spline function, the PWL spline function comprising a plurality of knee points.

5. The method of claim 4 further comprising:
determining the power curve based on the plurality of the knee points using a curve fitting technique.

6. The method of claim 1, wherein decompressing the compressed image further comprises:
applying a first decompression amount to a first region of the compressed image having a first pixel value; and
applying a second decompression amount to a second region of the compressed image having a higher second pixel value, wherein after decompression the second region has a greater residual compression than the first region.

7. The method of claim 6, wherein the first pixel value of the first region corresponds to a first luminance value of the first region and the second pixel value of the second region corresponds to a second luminance value of the second region, and wherein the second luminance value is higher than the first luminance value.

8. The method of claim 1, wherein to compress the image from the first bit-depth to the second bit-depth, the image sensor is to:
apply a first compression amount to a first region of a captured image having a first pixel value according to the power curve or a second power curve; and
apply a second compression amount to a second part of the captured image having a higher second pixel value according to the power curve or the second power curve, wherein the first compression amount is lower than the second compression amount.

9. The method of claim 8, wherein to compress the image from the first bit-depth to the second bit-depth, the image sensor is to use a piece-wise linear (PWL) spline function associated with the power curve or the second power curve, the PWL spline function comprising a plurality of knee points.

10. The method of claim 9, wherein the image sensor is to determine the power curve or the second power curve based on the plurality of the knee points using a curve fitting technique.

11. A system comprising:
a memory device; and
a processing device operatively coupled to the memory device to:
determine a first bit-depth associated with a sensor of a camera;
determine a second bit-depth associated with an image signal processing (ISP) pipeline associated with the camera; and
responsive to determining that the first bit-depth is different than the second bit-depth:
determine a third bit-depth associated with a compressed image generated by the sensor of the camera,
determine a plurality of knee points corresponding to a piece-wise linear (PWL) spline function of the sensor of the camera, based on the third bit-depth and the second bit-depth of the ISP, and
determine a power curve to be used to decompress the compressed image to generate a partially decompressed image having the second bit-depth.

12. The system of claim 11, wherein a plurality of regions of the partially decompressed image are decompressed at separate decompression levels based on a corresponding pixel value of each region of the plurality of regions in a manner that preserves a color ratio of the compressed image and maintains a signal to noise ratio for the compressed image below a signal to noise ratio threshold.

13. The system of claim 11, wherein the power curve comprises a linear segment for processing pixel values that are below a pixel value threshold, and wherein the linear segment preserves a color ratio and a signal to noise ratio for low light conditions.

14. The system of claim 11, wherein the compressed image is captured at the first bit-depth associated with the sensor and is compressed to the third bit-depth that is lower than the first bit-depth, and wherein the second bit-depth of the ISP is lower than the first bit-depth and higher than the third bit-depth.

15. The system of claim 11, wherein to decompress the compressed image, the processing device is further to:
apply a first decompression amount to a first region of the compressed image having a first pixel value; and
apply a second decompression amount to a second region of the compressed image having a higher second pixel value, wherein after decompression the second region has a greater compression than the first region.

16. An electronic device comprising:
a memory; and
one or more processors operatively coupled to the memory to perform operations comprising:
receiving, at the one or more processors associated with an image signal processing (ISP) pipeline, a compressed image generated by an image sensor, wherein the compressed image is captured at a first bit-depth associated with the image sensor and is compressed to a second bit-depth that is lower than the first bit-depth, and wherein the ISP is associated with a third bit-depth that is lower than the first bit-depth and higher than the second bit-depth; and
decompressing the compressed image according to a power curve to generate a partially decompressed image having the third bit-depth, wherein a plurality of regions of the partially decompressed image are decompressed at separate decompression levels based on a corresponding pixel value of each region of the plurality of regions.

17. The electronic device of claim 16, wherein the power curve comprises a linear segment that extends to a pixel value threshold for linearly processing pixel values that are below the pixel value threshold.

18. The electronic device of claim 17, wherein processing pixel values based on the linear segment of the power curve comprises avoiding compressed states of the pixel values to preserve signal to noise ratio (SNR) of the pixel values.

19. The electronic device of claim 16, wherein the power curve corresponds to a piece-wise linear (PWL) spline function, the PWL spline function comprising a plurality of knee points.

20. The electronic device of claim 19, wherein the one or more processors are to perform further operations further comprising:
determining the power curve based on the plurality of the knee points using a curve fitting technique.

21. The electronic device of claim 16, wherein decompressing the compressed image further comprises:
applying a first decompression amount to a first region of the compressed image having a first pixel value; and
applying a second decompression rate to a second region of the compressed image having a higher second pixel value, wherein after decompression the second region has a greater residual compression than the first region.

22. The electronic device of claim 21, wherein the first pixel value of the first region corresponds to a first luminance value of the first region and the second pixel value of the second region corresponds to a second luminance value of the second region, and wherein the second luminance value is higher than the first luminance value.

23. The electronic device of claim 16, wherein to compress the compressed image from the first bit-depth to the third bit-depth, the image sensor is to:
apply a first compression amount to a first region of a captured image having a first pixel value; and
apply a second compression amount to a second part of the captured image having a higher second pixel value, wherein the first compression amount is lower than the second compression amount.

24. The electronic device of claim 16, wherein to compress the compressed image from the first bit-depth to the third bit-depth, the image sensor is to use a piece-wise linear (PWL) spline function associated with the power curve or a second power curve, the PWL spline function comprising a plurality of knee points.

25. The electronic device of claim 24, wherein the image sensor is to determine the power curve or the second power curve based on the plurality of the knee points using a curve fitting technique.

* * * * *